(12) United States Patent
Nugent, Jr. et al.

(10) Patent No.: US 12,109,903 B2
(45) Date of Patent: Oct. 8, 2024

(54) SYSTEMS AND METHODS FOR DELIVERY OF POWER OR FLUIDS

(71) Applicant: Mission Critical Electronics, LLC, Huntington Beach, CA (US)

(72) Inventors: Thomas H. Nugent, Jr., Port Jefferson Station, NY (US); Caleb T. Hatfield, Lowell, AR (US); John K. George, Fayetteville, AR (US); Kristopher Cody Johnson, Springdale, AR (US); Philip Sgroi, Shirley, NY (US); Dale Tomkins, Plymouth, WI (US)

(73) Assignee: Mission Critical Electronics, LLC, Huntington Beach, CA (US)

( * ) Notice: Subject to any disclaimer, the term of this patent is extended or adjusted under 35 U.S.C. 154(b) by 419 days.

(21) Appl. No.: 17/449,215

(22) Filed: Sep. 28, 2021

(65) Prior Publication Data
US 2022/0153160 A1 May 19, 2022

Related U.S. Application Data

(60) Provisional application No. 63/113,716, filed on Nov. 13, 2020.

(51) Int. Cl.
| | |
|---|---|
| *B60L 53/14* | (2019.01) |
| *B60L 53/30* | (2019.01) |
| *B60L 53/35* | (2019.01) |
| *B60L 53/62* | (2019.01) |

(52) U.S. Cl.
CPC .............. *B60L 53/62* (2019.02); *B60L 53/14* (2019.02); *B60L 53/305* (2019.02); *B60L 53/35* (2019.02)

(58) Field of Classification Search
CPC ........ B60L 53/62; B60L 53/14; B60L 53/305; B60L 53/35
USPC ....................................................... 180/65.1
See application file for complete search history.

(56) References Cited

U.S. PATENT DOCUMENTS

| | | | | |
|---|---|---|---|---|
| 5,416,298 | A * | 5/1995 | Robert ................. | B23K 26/067 219/121.75 |
| 6,157,162 | A * | 12/2000 | Hayashi ............... | H02J 7/0042 320/104 |
| 9,227,520 | B2 * | 1/2016 | Kimura ................. | B60L 53/16 |
| 9,533,587 | B2 * | 1/2017 | Krammer .............. | B60L 53/18 |
| 10,661,669 | B1 * | 5/2020 | Torok .................... | B60L 53/30 |
| 10,685,455 | B2 * | 6/2020 | Sinha .................... | G06V 10/751 |
| 11,855,469 | B1 * | 12/2023 | Foland .................. | B64F 1/362 |
| 11,863,004 | B2 * | 1/2024 | Cesiel ................... | B60L 53/22 |

(Continued)

OTHER PUBLICATIONS

"SAFX Trailer Power, Auto Eject", Purkeys, Mar. 2021, 2 pages.

(Continued)

*Primary Examiner* — Hau V Phan

(57) ABSTRACT

An electrical delivery apparatus. The apparatus includes a plug assembly configured to be inserted into a receptacle apparatus of a vehicle to deliver electrical power to the vehicle. The apparatus includes a control means configured to, upon activation, deliver electrical power to the vehicle via an electrical line and the plug assembly, and, upon detection of at least one predetermined condition, automatically disconnect the electrical power from the electrical line and the plug assembly. The predetermined condition includes disconnection of the plug assembly from the receptacle apparatus.

19 Claims, 20 Drawing Sheets

(56) References Cited

U.S. PATENT DOCUMENTS

| | | | |
|---|---|---|---|
| 2011/0066515 A1* | 3/2011 | Horvath | B60L 53/36 |
| | | | 705/17 |
| 2013/0076902 A1* | 3/2013 | Gao | B25J 9/042 |
| | | | 348/148 |
| 2014/0176070 A1* | 6/2014 | Krammer | B60L 53/35 |
| | | | 320/109 |
| 2017/0129357 A1* | 5/2017 | Zheng | B60L 53/11 |
| 2019/0232812 A1* | 8/2019 | Itoh | B60L 53/16 |
| 2020/0189413 A1* | 6/2020 | Fagan | B60L 53/18 |
| 2020/0235522 A1* | 7/2020 | Lv | B60L 53/16 |

OTHER PUBLICATIONS

"SAFX Trailer Power, Auto Safe", Purkeys, Mar. 2021, 2 pages.
"Explore SAFX", Purkeys, Jun. 24, 2021, 10 pages.
"Purkeys SAFX Allows Reefer Trailers to Plug into 480V Shore Power", Truckinginfo, by Heavy Duty Trucking Staff, Apr. 29, 2021, 5 pages.
"SAFX power system to aid eTRU connections", Trailer Body Builders, May 3, 2021, 7 pages.
"SAFX Tried and eTRU, 480 VAC Power", Purkeys, Jun. 24, 2021, 5 pages.
"SAFX by Mission Critical Electronics, Auto Eject", Purkeys, 2 pages.
"SAFX by Mission Critical Electronics, Auto Safe", Purkeys, 2 pages.
https://www.youtube.com/watch?v=xaG6j2l7IdU, May 13, 2021.
https://www.youtube.com/watch?v=20O3zOLIf0Q, May 13, 2021.
https://www.youtube.com/watch?v=v3fG9QTv4wM, Apr. 28, 2021.

* cited by examiner

SYSTEMS AND METHODS FOR DELIVERY OF POWER OR FLUIDS

CROSS-REFERENCE TO RELATED APPLICATION

This application claims the benefit of the filing date of U.S. Provisional Patent Application 63/113,716, filed Nov. 13, 2020, which is hereby incorporated by reference.

TECHNICAL FIELD

The present disclosure is directed, in general, to apparatuses, methods, and devices for safely delivering electricity, a fluid, or a gas to a vehicle, trailer, or other object. Specific embodiments are directed to electric-power delivery systems.

BACKGROUND OF THE DISCLOSURE

It is often necessary to deliver power, fluids, or gasses to vehicle, structures, and other objects, and safe delivery is always desirable. With electrical connections, it can be particularly important to ensure that live wires are isolated from the ground and from structures, vehicles, and people. Improved systems are desirable.

SUMMARY OF THE DISCLOSURE

Various disclosed embodiments include a delivery apparatus having a drive mechanism and boom supported by a support structure. The drive mechanism is configured to extend and retract a supply line along the boom. The supply line is one of an electrical line, a gas line, or a fluid line.

Various embodiments include an electrical delivery apparatus. The electrical delivery apparatus can include a plug assembly configured to be inserted into a receptacle apparatus of a vehicle to deliver electrical power to the vehicle. The electrical delivery apparatus can include a control means configured to, upon activation, deliver electrical power to the vehicle via an electrical line and the plug assembly, and, upon detection of at least one predetermined condition, automatically disconnect the electrical power from the electrical line and the plug assembly. The at least one predetermined condition can include disconnection of the plug assembly from the receptacle apparatus.

In various embodiments, the receptacle apparatus includes a solenoid configured to physically eject the plug assembly from the receptacle apparatus. In various embodiments, the receptacle apparatus is configured to detect that a charging process is complete and, in response, eject the plug assembly from the receptacle apparatus. In various embodiments, the receptacle apparatus is connected to a brake pressure sensor and is configured to, in response to a signal from the brake pressure sensor, eject the plug assembly from the receptacle apparatus.

In various embodiments, the receptacle apparatus is configured to eject the plug assembly from the receptacle apparatus upon detection of a brake pressure release, a brake electrical signal, or vehicle ignition signal. In various embodiments, the receptacle apparatus is configured to detect a brake pressure release, a brake electrical signal, and vehicle ignition signal, and is configured eject the plug assembly from the receptacle apparatus upon detection of the brake pressure release, the brake electrical signal, or the vehicle ignition signal.

In various embodiments, the control means is activated to energize the electrical cable by detecting a button-press by an operator. In various embodiments, the control means is activated to energize the electrical cable by detecting a button-press by an operator while also detecting that the plug assembly is inserted in the receptacle apparatus.

In various embodiments, the delivery apparatus configured to retract the electrical line from the vehicle when the plug assembly is disconnected from the receptacle apparatus. In various embodiments, the delivery apparatus also includes a boom that extends from a support structure and supports the electrical line between the control means and the plug assembly, and the electrical line is retracted along the boom when the plug assembly is disconnected from the receptacle apparatus. In various embodiments, the boom is configured to support the electrical line so that the electrical line and the plug assembly do not touch the ground when the plug assembly is connected to the receptable apparatus and when the plug assembly is disconnected from the receptacle apparatus.

Various embodiments include a drive mechanism mounted to the support structure and configured to move the electrical line between a deployed position and a retracted position. In various embodiments, the drive mechanism is one of a chain-driven track system, a spring-driven automatic reel, a spring-driven slide rail mechanism, a gravity-driven slide rail mechanism, or a linear actuator-driven mechanism.

Other embodiments include an electrical delivery apparatus that can include a plug assembly configured to be inserted into a receptacle apparatus of a vehicle to deliver electrical power to the vehicle. The electrical delivery apparatus can include a control means configured to, upon activation, deliver electrical power to the vehicle via an electrical line and the plug assembly, and, upon detection of at least one predetermined condition, automatically disconnect the electrical power from the electrical line and the plug assembly. The at least one predetermined condition can include disconnection of the plug assembly from the receptacle apparatus. The electrical delivery apparatus can include a support structure and a drive mechanism mounted to the support structure and configured to retract the electrical line from the vehicle when the plug assembly is disconnected from the receptacle apparatus.

Various embodiments also include a boom that extends from a support structure and supports the electrical line between the control means and the plug assembly, where the electrical line is retracted along the boom when the plug assembly is disconnected from the receptacle apparatus. In various embodiments, the drive mechanism is one of a chain-driven track system, a spring-driven automatic reel, a spring-driven slide rail mechanism, a gravity-driven slide rail mechanism, or a linear actuator-driven mechanism. In various embodiments, the drive mechanism is controlled by the control means to retract the electrical line. In various embodiments, the drive mechanism is configured to move the electrical line between a deployed position and a retracted position.

In various embodiments, the receptacle apparatus is connected to a brake pressure sensor of the vehicle and is configured to, in response to a signal from the brake pressure sensor, eject the plug assembly from the receptacle apparatus. In various embodiments, the receptacle apparatus is configured to detect a brake pressure release, a brake electrical signal, and a vehicle ignition signal, and is configured eject the plug assembly from the receptacle apparatus upon detection of the brake pressure release, the brake electrical signal, or the vehicle ignition signal.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

The figures discussed below and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Disclosed embodiments include a delivery apparatus that can automatically extend to move a delivery means or supply line, such as a gas line, a fluid line, or an electrical line, into proximity to the vehicle, structure, or other object to which the delivery means is to be attached. The examples below are described in terms of an electrical delivery apparatus, but the principles disclosed herein can be applied to delivery of fluids and gasses.

Figure 1:
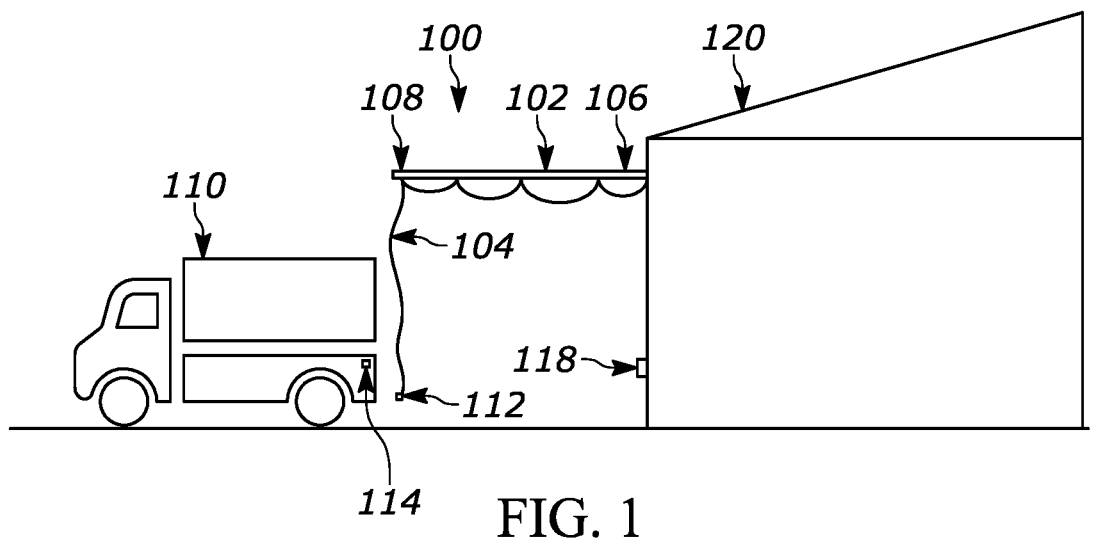
FIG. 1 illustrates an example of a delivery apparatus, in accordance with disclosed embodiments.

FIG. 1 illustrates a non-limiting example of a delivery apparatus 100, in accordance with disclosed embodiments, in a deployed position. Delivery apparatus 100, in this example, includes a boom 102 that extends from a support structure 120, which in this case is a building. Boom 102 supports an electrical line 104, which is one example of a suitable delivery means. Electrical line 104 extends along and is supported by boom 102 from a proximal end 106 of the boom 102 (that is, proximate to the support structure 120) to a distal end 108 of the boom 102. At the distal end of the boom 102, the electrical line 104 hangs down to a position where it can be connected to a vehicle 110 (or other object). Electrical line 104 may include a plug 112 that is configured to be inserted into a receptacle 114 on the vehicle 110. In the embodiments disclosed herein, "vehicle" refers to and is used to represent any vehicle, trailer, or other machine or object that is connected to an electrical, gas, or fluid line as described herein.

In various embodiments, the boom 102 may be as short or long as necessary to function as described or claimed herein. For example, in some cases, the boom may extend from the support structure (at the proximal end) for several feet to the distal end, which may be particularly advantageous in chain-driven or actuator-driven systems. In other cases, the boom may be relatively short and only extend far enough from the support structure to support a drive mechanism such as an automatic reel or other mechanism.

The power to the electrical line 104 may be controlled by a control means 118. Control means 118 may include one or more user interfaces such as buttons, lights, switches, and the like. Control means 118 may include one or more controllers, memories, or other components to operate as described herein. Control means 118 may also control delivery apparatus 100 and its movement between the deployed position illustrated in FIG. 1 and the retracted position illustrated in FIG. 2 below. Examples of aspects of some possible control means are described herein.

Figure 2:
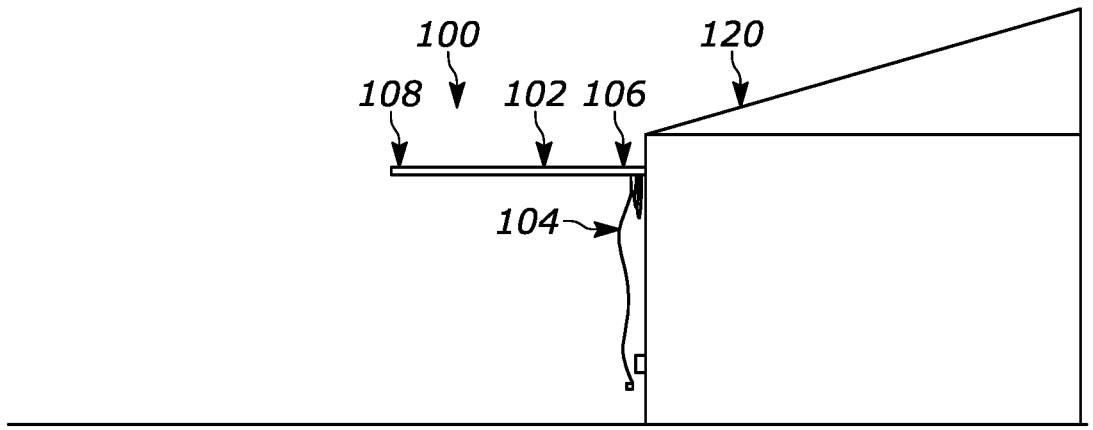
FIG. 2 illustrates an example of delivery apparatus in a retracted position.

FIG. 2 illustrates a non-limiting example of delivery apparatus 100 in a retracted position. Delivery apparatus 100, in this example, includes a boom 102 that extends from a support structure 120. Boom 102 supports electrical line 104, which in the retracted position is retracted to that it hangs from proximal end 106 of the boom 102.

In specific non-limiting embodiments, the delivery apparatus 100 can provide a reinforced path for a 480V 3-phase AC electrical power cord assembly, represented by electrical line 104, from a power source to a power receptacle 114 of the vehicle 110. The power source, not shown in the examples of FIGS. 1 and 2, can be any power source connected to the electrical line 104 at the end located at (or in) the support structure 120. Delivery apparatus 110 may be used with other types of electrical lines 104, such as 120V single-phase AC, 240V split-phase AC, etc., and may have applications outside of vehicle shore power systems. While, in some contexts, "shore power" refers to provision of shoreside electrical power to a ship at berth while its main and auxiliary engines are shut down, this term as used herein refers to any external electrical power provided to a land or sea vehicle or trailer from an apparatus as described herein.

Delivery apparatus 100 automatically extends electrical line 104 to a position where it can be connected to the vehicle 110, without allowing electrical line 104 or the plug 112 to touch the ground. Delivery apparatus 100 can automatically retract the electrical line 104 back to the retracted position, which can eliminate or mitigate the need for an operator to reposition to electrical line 104 after charging or supplying power has ended.

In specific embodiments, plug 112 and power receptacle 114 can be implemented with Kussmaul® Auto Eject® plug assembly, which will automatically become uncoupled from a trailer/vehicle 110 under specific circumstances, such as when vehicle 110 is started or when the brake system is released. Power receptacle 114 can alternatively be implemented, in some non-limiting examples, as an auto-eject receptacle apparatus as described herein.

In specific embodiments, delivery apparatus 100 can detect, by control means 118, when plug 112 is removed or ejected from power receptacle 114 and automatically retract the electrical line 104 to the retracted position. Control means 118 can also control the power supplied to electrical line 104 and plug 112 so that electrical line 104 is not "live" until and unless plug 112 is inserted into power receptacle 114 and a user has requested activation, such as by pressing a button on control means 118. Control means 118 can also control movement of the delivery apparatus 100 between the deployed position and the retracted position, such as in response to a user activation, detection of the proximity (or not) of a vehicle, and otherwise.

In other embodiments, delivery apparatus 100 and its support structure 120 can be located in any advantageous location, such as inside a building, outside of a building, partially inside and partially outside of a building, free standing, attached to other structures, on a loading dock, on a pier, or otherwise.

Figure 3:
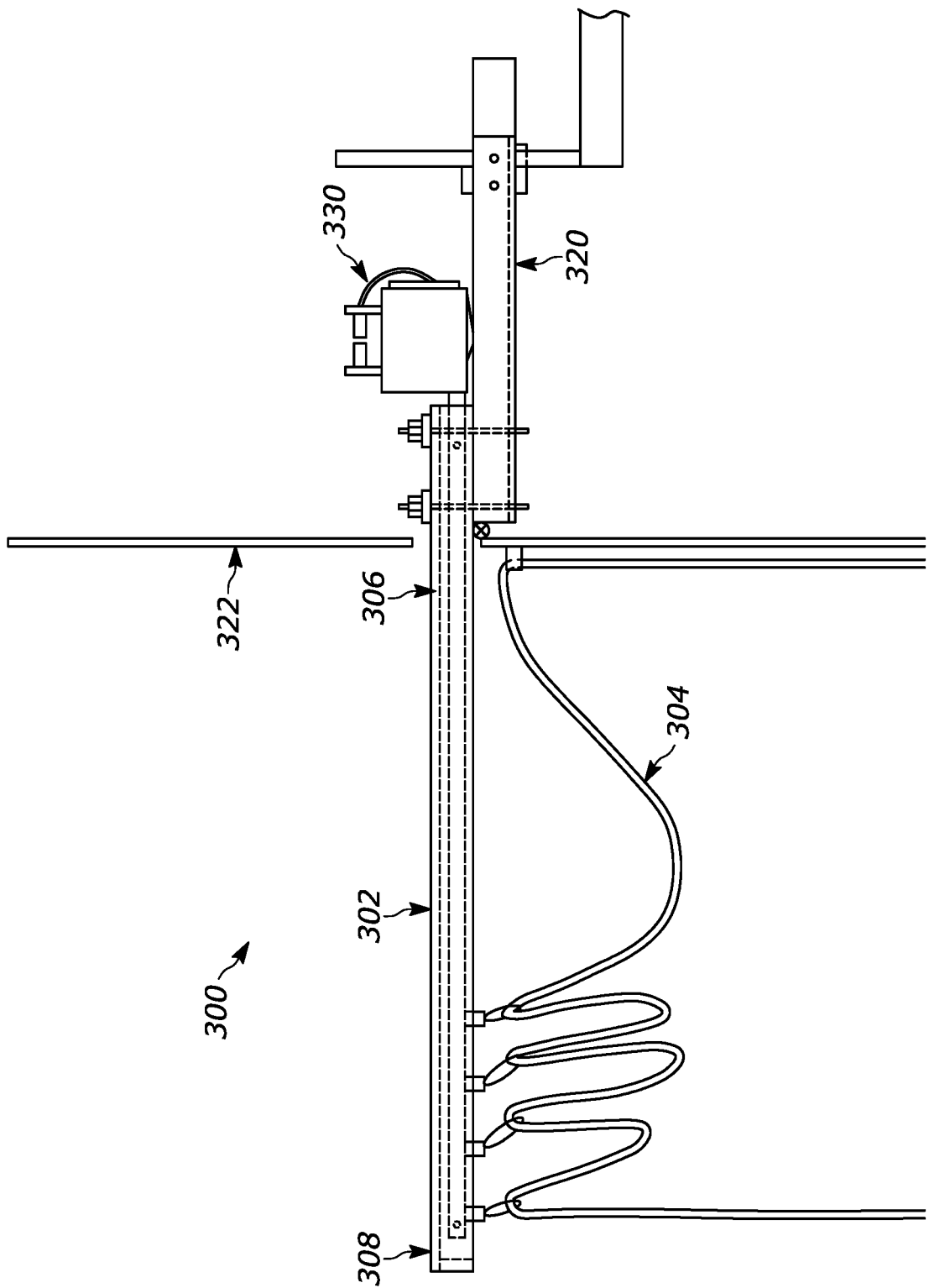
FIG. 3 illustrates a delivery apparatus structure in accordance with disclosed embodiments in a deployed position.

FIG. 3 illustrates a non-limiting example of a delivery apparatus structure in accordance with disclosed embodiments in a deployed position. Delivery apparatus 300, in this example, includes a boom 302 that extends from a support structure 320, which in this case is mounted inside a building so that boom 302 extends through and out of an exterior wall 322. Boom 302 supports an electrical line 304, which is one example of a suitable delivery means. Electrical line 304 extends along and is supported by boom 302 from a proximal end 306 of the boom 302 (that is, proximate to the support structure 320) to a distal end 308 of the boom 302. At the distal end of the boom 302, the electrical line 104 hangs down to a position where it can be connected to a vehicle 110 (or other object).

This example shows a drive mechanism 330 mounted to the support structure 320 and configured to move the electrical line 304 on boom 302 between the deployed position (shown) and the retracted position. In this example, drive mechanism 330 is implemented using a chain drive, and the FIG. 3 illustrates that electrical line 304 can be suspended from a series of hooks or other attachments to boom 302 or a chain or other portion of drive mechanism 330 extending along boom 302.

Other embodiments can implement the drive mechanism 330 in any of a number of ways, such as (but not limited to) using a chain driven track system, using a spring ratchet (automatic reel)/slide rail mechanism, using a gravity/counterweight slide rail mechanism, or using a linear actuator-driven mechanism.

In an exemplary implementation using a chain drive as the drive mechanism 330, the control means can control a motorized rotational chain drive that causes the electrical line 304 to extend and retract automatically along the boom 302. The motor drives the chain link when a signal is sent to the unit via the control means, such as a Kussmaul® Auto Safe™ control system or other control system as described herein. In the example of FIG. 3, the delivery apparatus 300 is mounted partially inside of a warehouse building and connected support structure 320, with the boom and other components outside of the warehouse.

Figure 4:
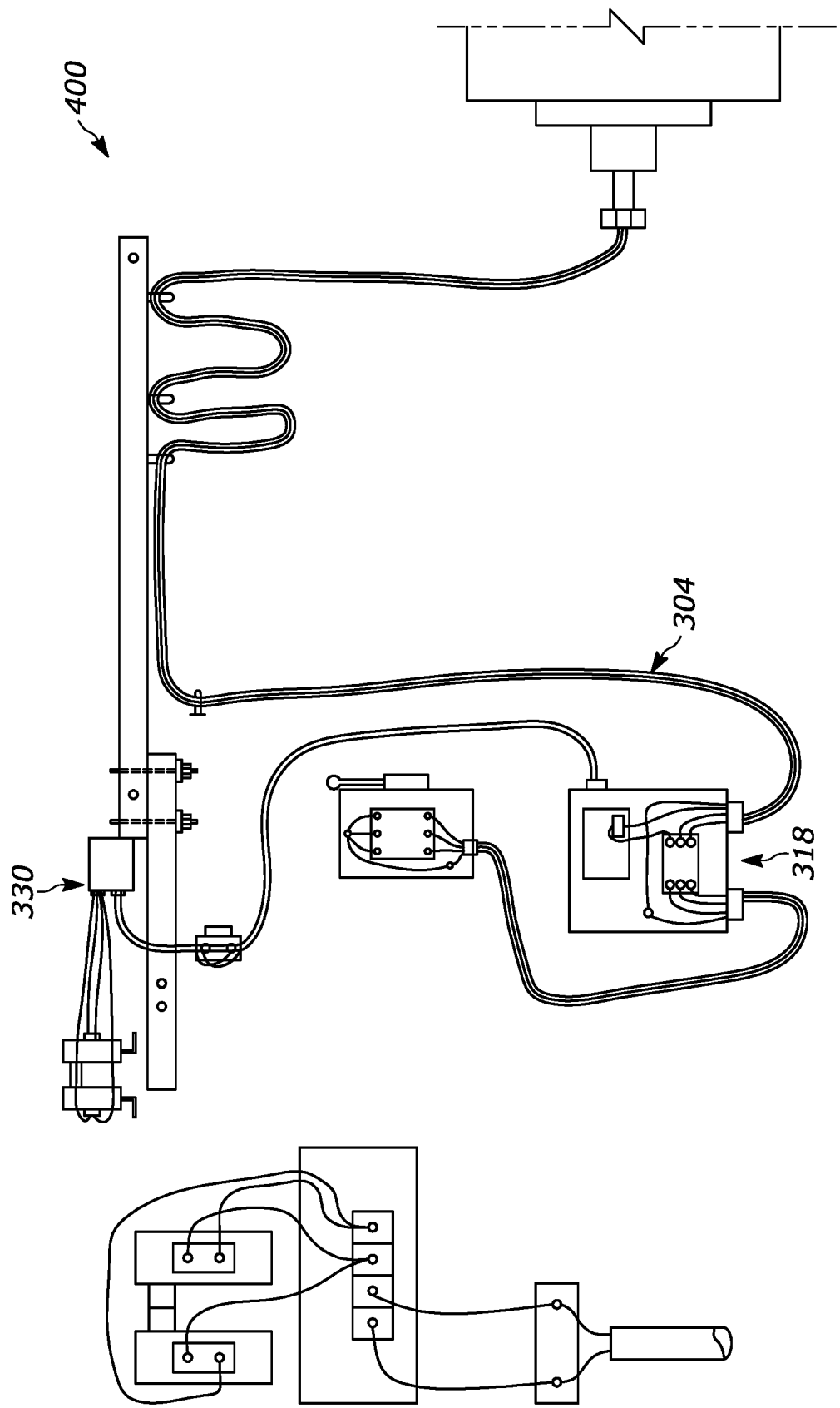
FIG. 4 illustrates an example of an electrical schematic for a delivery apparatus in accordance with disclosed embodiments.

FIG. 4 illustrates a non-limiting example of an electrical schematic 400 for a delivery apparatus in accordance with disclosed embodiments, corresponding to delivery apparatus 300 with a chain drive as a drive mechanism 330. In this example, the control means 318 is connected to the AC power and selectively powers both the drive mechanism 330 (chain drive in this example) and the electrical line 304. A test switch can be interposed between the control means 318 and the drive mechanism 330. The drive mechanism can include an interlock, such as a chain drive interlock.

In an embodiment illustrated in FIGS. 3 and 4, control means 318 controls a motorized rotational chain drive (drive mechanism 330) that gives the electrical line 304 the ability to extend and retract automatically along the linear track of boom 302. The motor drives the chain link when a signal is sent to the drive mechanism 330 by control means 318.

Using the delivery apparatus of FIGS. 1-4 as an example, the delivery apparatus 100 can ensure safe power connection to a vehicle 110. For example, an operator can move a vehicle 108 into position to be connected to the electrical line 304, which is in its retracted position. The operator activates the control means 118, such as by pushing a button, and the control means activates a drive mechanism 330 to extend the electrical line 104 along the boom 102 into the deployed position where the electrical line 104 can be connected to power receptacle 114 of the vehicle 110. During this operation, electrical line 104 can be consistently kept off the ground by boom 102, and electrical line 104 is preferably unpowered.

The operator can connect electrical line to power receptacle 114 of the vehicle and again activate control means 118, such as by pushing the same or a different button, to indicate that the connection is secure. At this point, control means 118 energizes electrical line 104 to provide power to vehicle 110.

When power from electrical line 104 is no longer needed or desired, electrical line 104 can be disconnected from vehicle 110. Control means 118 can sense the disconnection and automatically activate drive mechanism 330 to return the electrical line 104 to its retracted position. Disconnection can be manual, such as by the operator, or can be automatic such as by a Kussmaul® Auto Eject® connector when charging is completed, when the vehicle is started, placed in gear, or has its brake pedal pressed, or under other conditions.

Figure 5:
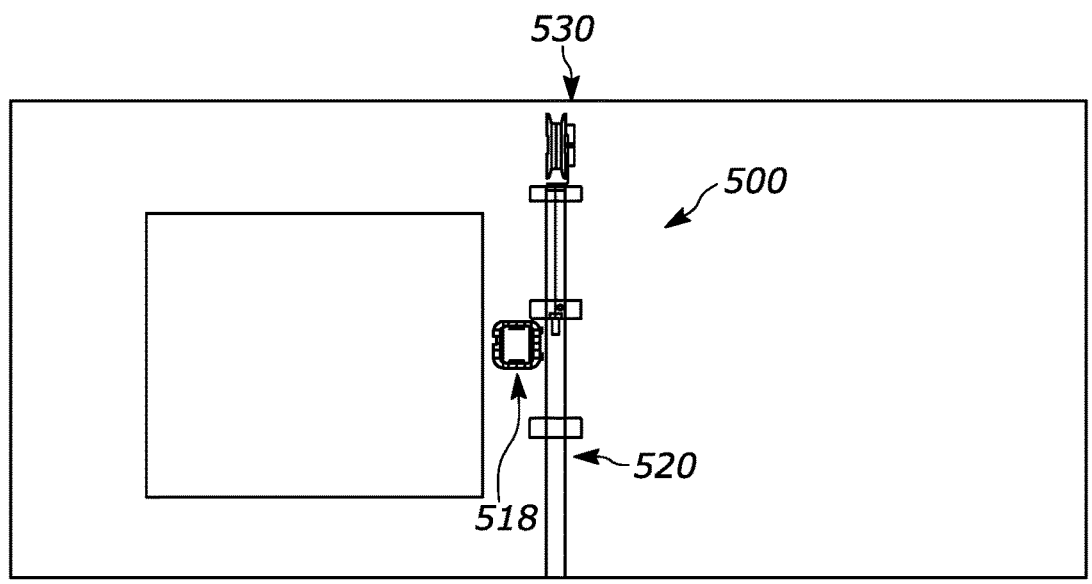
FIGS. 5, 6, and 7 illustrate examples of delivery apparatuses in accordance with disclosed embodiments.

FIG. 5 illustrates a non-limiting example of a delivery apparatus 500 in accordance with disclosed embodiments, including support structure 520, drive mechanism 530, and control means 518.

Figure 6:
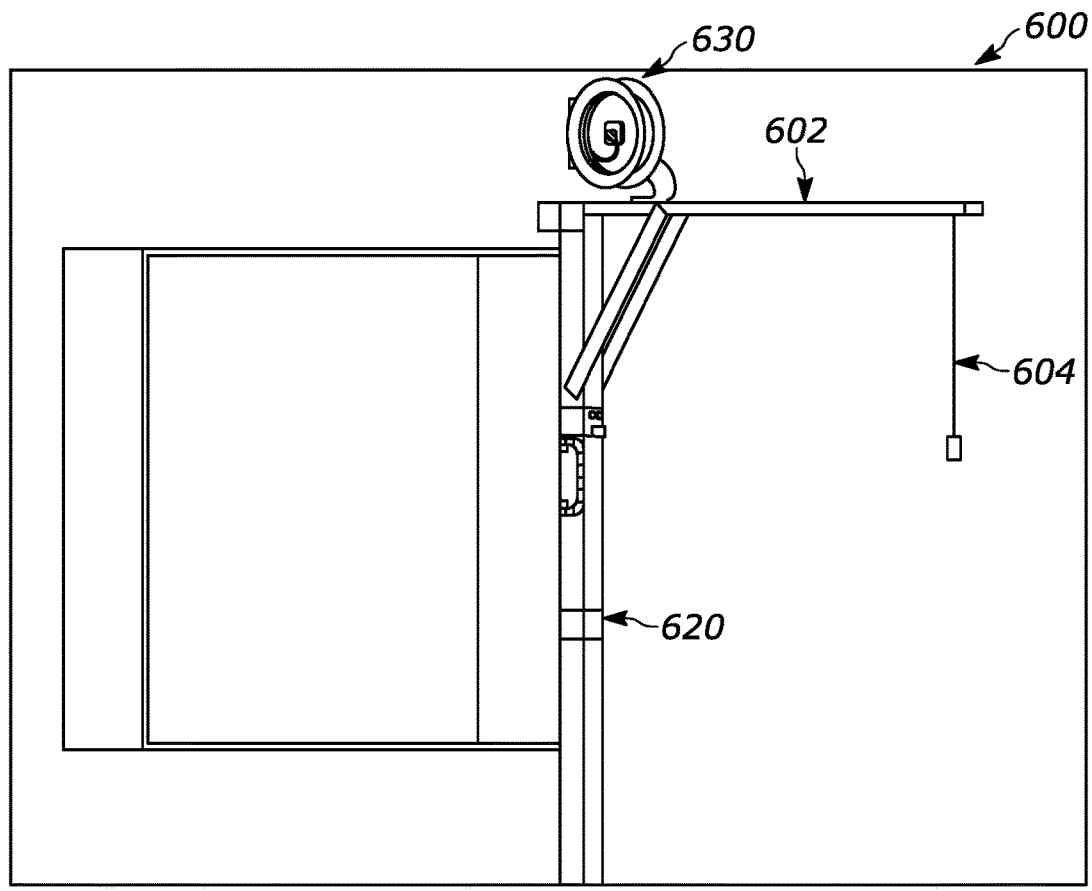

FIG. 6 illustrates a non-limiting example of a delivery apparatus 600 in accordance with disclosed embodiments, in a deployed position, including support structure 620, drive mechanism 630, boom 602, and electrical line 604.

Figure 7:
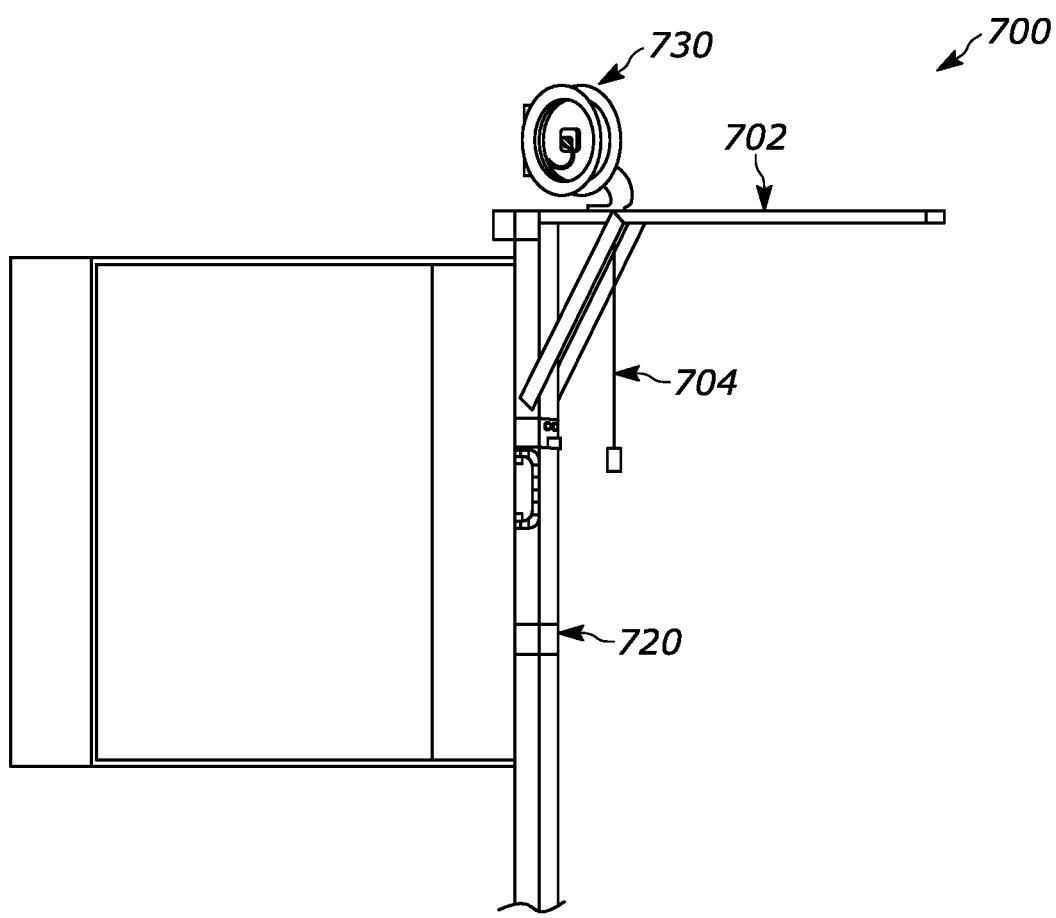

FIG. 7 illustrates a non-limiting example of a delivery apparatus 700 in accordance with disclosed embodiments, in a deployed position, including support structure 720, drive mechanism 730, boom 702, and electrical line 704.

Various embodiments can use a spring ratchet (automatic reel)/slide rail mechanism as the drive mechanism for extending and retracting the electrical line along the boom. Such embodiments may be particularly useful in embodiments that are free-standing or mounted fully outside of a building, such as illustrated in FIGS. 5-7. In such embodiments, the drive mechanism can be implemented with a slide rail mechanism in place of a chain driving mechanism. Instead of requiring an electronic control means, such embodiments can allow the operator to apply tension to the electrical line and be able to move the cord manually when extending the cord out to the trailer/vehicle. An automatic reel as part of the drive mechanism mounted atop the support structure allows the cord to be pulled and will ratchet the electrical line so when the operator finishes extending the electrical line, it will stay in place without retracting back into an unused position. When the electrical line is disconnected from the vehicle, the automatic reel can be released by a solenoid mechanism or other mechanism attached to the ratcheting mechanism to allow the automatic reel to automatically retract the electrical line back towards the support structure. Such an automatic reel device can be implemented using various driving, release, and retraction mechanisms, such as a spring, a solenoid, a motor, another actuator, etc.

In still other embodiments, a spring ratchet (automatic reel) mechanism can be directly mounted on a support structure on the interior or exterior of a facility, without requiring a separate boom. In such cases, the electrical line may be routed or placed in such a way to ensure that, when deployed, it can be connected to an appropriate receptacle, and when retracted by the automatic reel mechanism, it is off the ground and unlikely to make unintentional contact with operators or vehicles. In various embodiments, an automatic reel mechanism, whether indoor or outdoor, standalone or as part of a delivery apparatus as described herein, can be configured to automatically extend and/or retract in response to a signal from a control means as described herein, for example in response to detecting that the electrical line has been connected to or disconnected from a receptacle.

Figure 8:
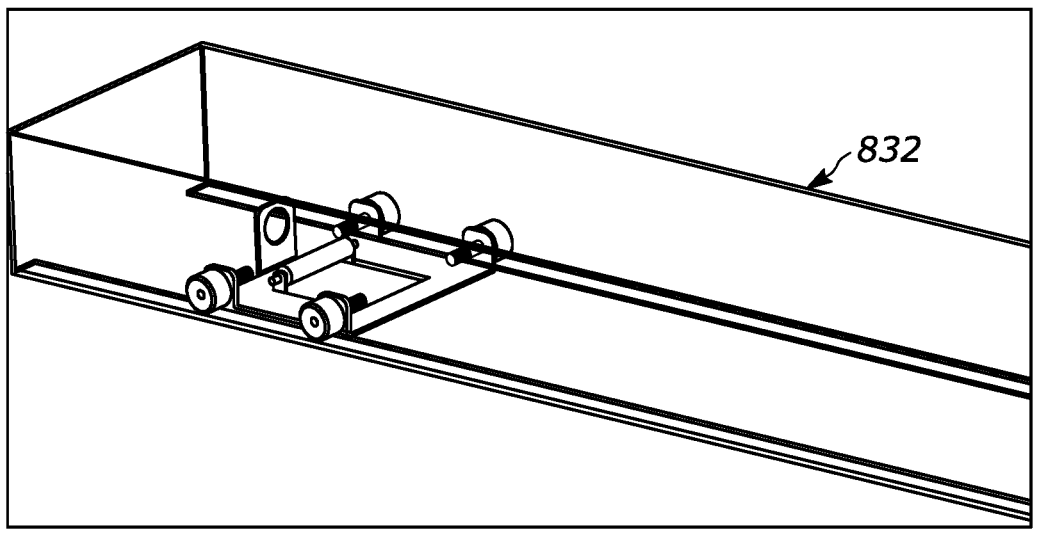
FIGS. 8 and 9 illustrate an example of a rolling track apparatus in accordance with disclosed embodiments.
Figure 9:
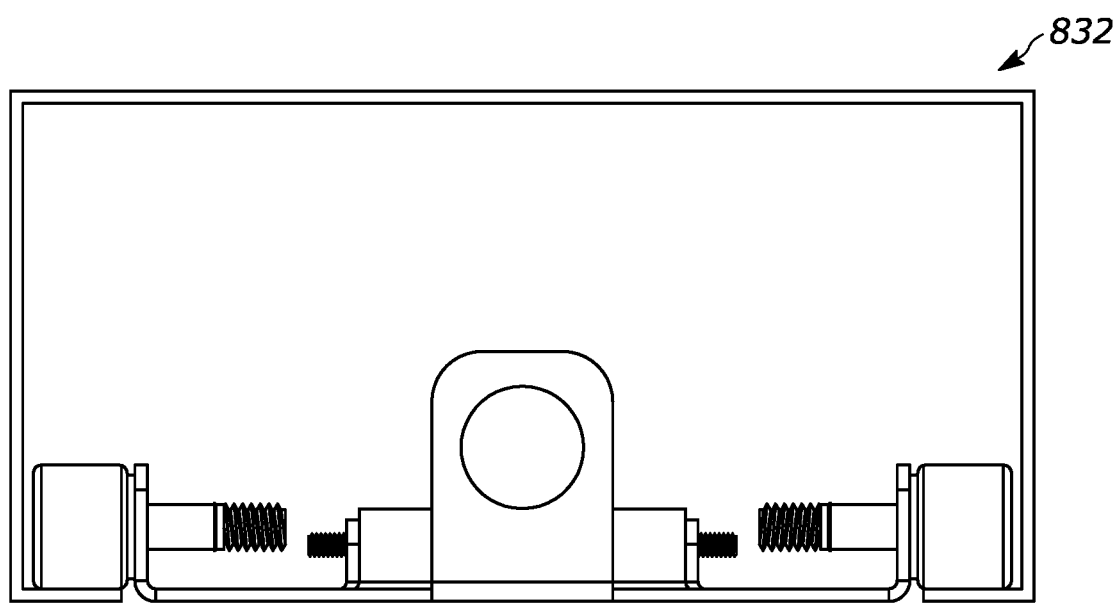

FIGS. 8 and 9 illustrate a non-limiting example of a rolling track apparatus 832 in accordance with disclosed embodiments, that can extend along a boom for extending and retracting an electrical cord under control of a drive mechanism.

Figure 10A:
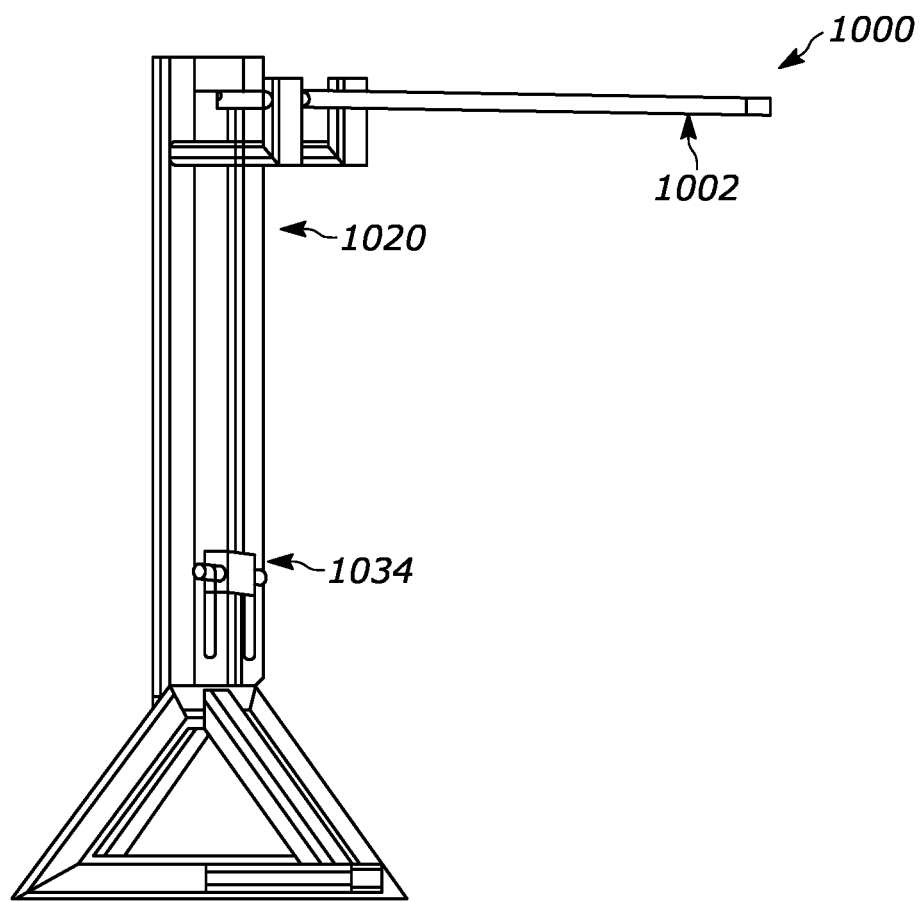
FIGS. 10A-10C illustrate an example of a delivery apparatus with a support structure that includes a counterweight as part of or in place of a drive mechanism, in accordance with disclosed embodiments.
Figure 10C:
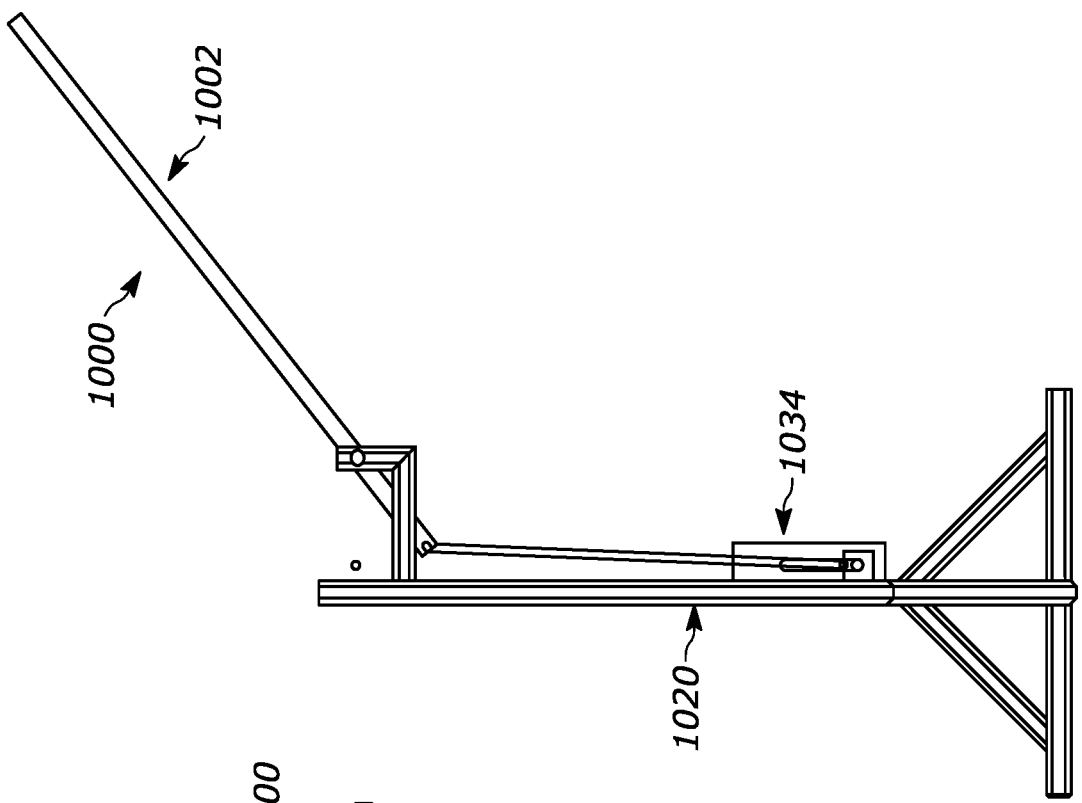
Figure 10B:
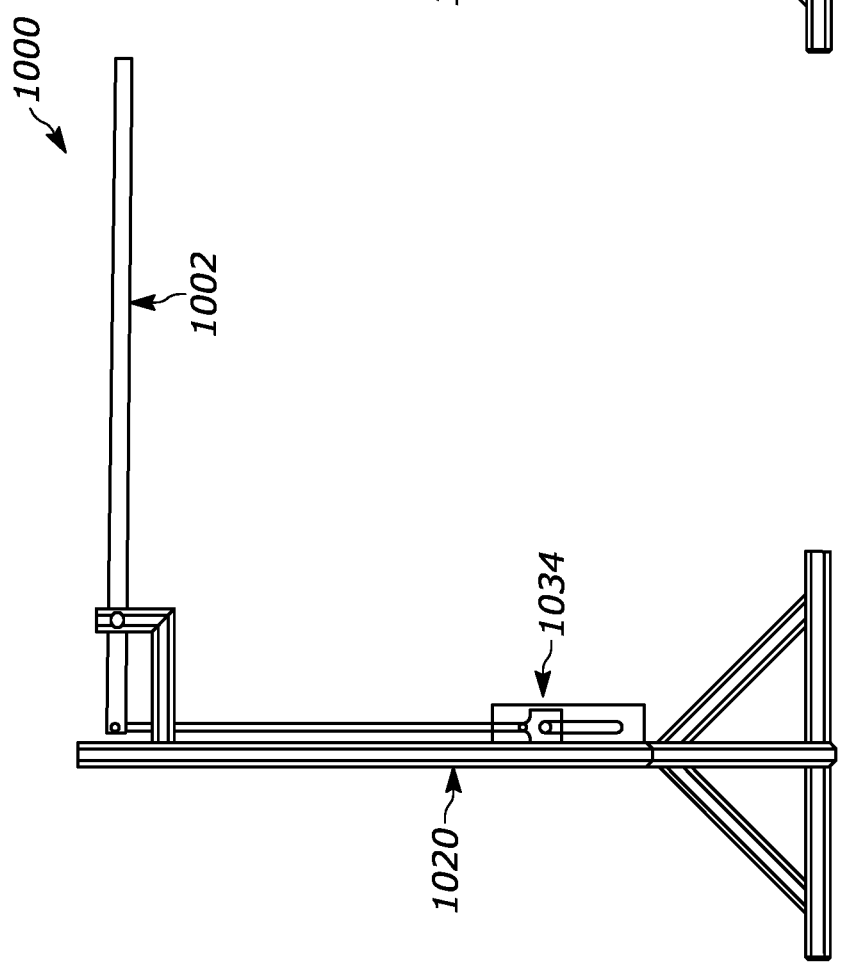

FIGS. 10A-10C illustrate a non-limiting example of a delivery apparatus 1000 with a support structure 1020 that includes a counterweight 1034 as part of or in place of a drive mechanism, in accordance with disclosed embodiments. FIGS. 10A and 10B illustrate the delivery apparatus in a deployed position with boom 1002 extended horizontally; FIG. 10C illustrates the delivery apparatus 1000 in a retracted position with the boom 1002 raised.

Various embodiments can use a gravity/counterweight slide rail mechanism in place of a chain drive or powered drive mechanism. In such embodiments, such as in the examples of FIGS. 10A-10C, the drive mechanism is implemented as a counterweight located at the base of the support structure. The counterweight can be connected to a slide rail such as illustrated in FIGS. 8 and 9 via a linkage. When beginning use of the electrical line, the operator can grab the electrical line and pull the electrical line towards the end of the boom 1002 (thus being the counter force to the weight) and make the connection to the vehicle. Tension is preferably constant on the electrical line throughout the use of the electrical line. When the electrical line is disconnected from the vehicle, the counterweight will then pull the proximal end of the boom 1002 down, lift the distal end of boom 1002 upward, and force the electrical line down the slide rail due to gravity.

Various embodiments can use a linear actuator driven mechanism as the drive mechanism. In such embodiments, a linear actuator can be powered to automatically extend and retract to allow for the electrical line to be extended or retracted in response to the force of gravity/tension supplied by an operator. This mechanism can be powered by either a linear actuator or a rack and pinion gear track that would move linearly.

Figure 11A:
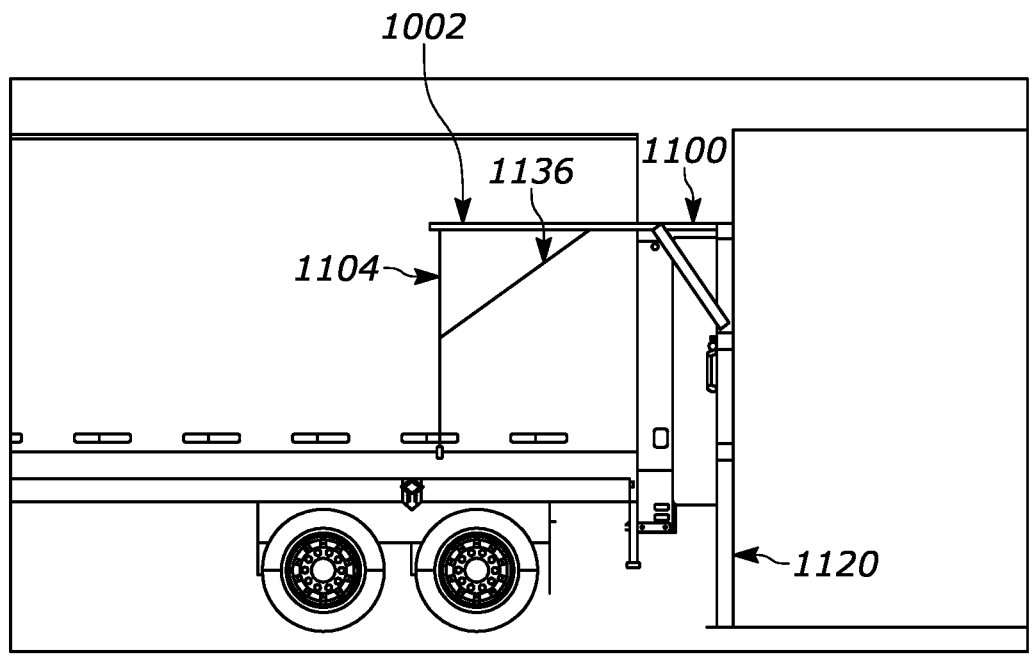
FIGS. 11A-11B illustrate an example of a delivery apparatus with a support structure that includes a spring mechanism as part of or in place of a drive mechanism, in accordance with disclosed embodiments.
Figure 11B:
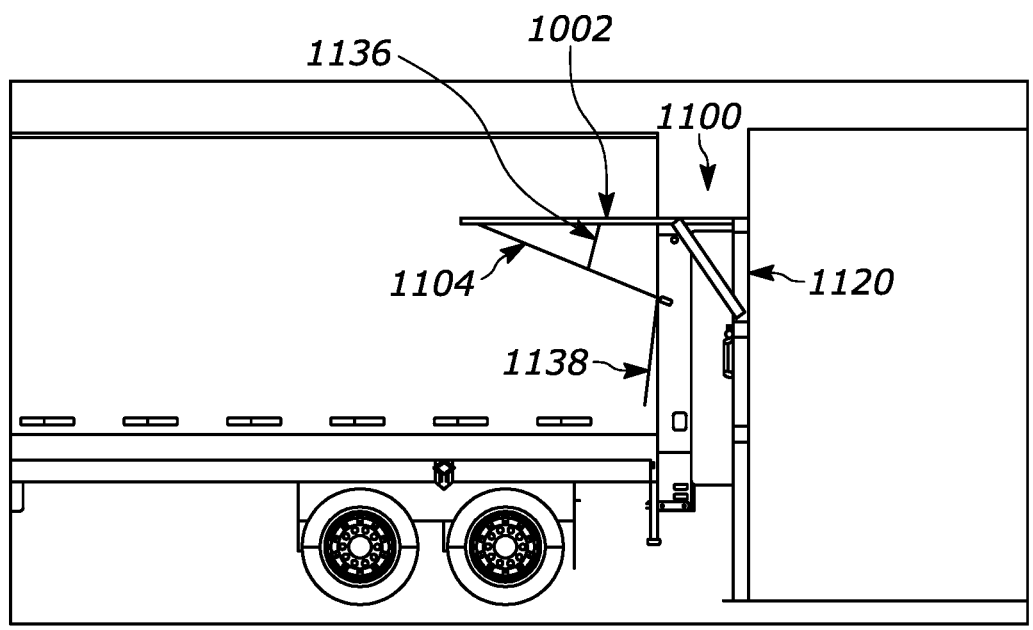

FIGS. 11A-11B illustrate a non-limiting example of a delivery apparatus 1100 with a support structure 1120 that includes a spring mechanism 1136 as part of or in place of a drive mechanism, in accordance with disclosed embodiments. FIG. 11A illustrates the delivery apparatus in a deployed position with boom 1102 extended horizontally and electrical line 1104's plug connected to the appropriate receptacle on the vehicle.

The embodiment of FIGS. 11A-11B uses tension spring mechanism 1136 as the component that controls and automatic retracting function. As illustrated in FIG. 11A, when the electrical line 1104 is powered and plugged into a vehicle receptacle, the spring mechanism 1136 is stretched and extended in the deployed position. Note that the electrical line 1104 can be connected to or travel within a rigid (or semi-rigid) boom extension that is connected to and pivots from the boom 1102, rather than just "dangling" from the end of the boom 1102, and the spring mechanism 1136 may be connected to the rigid boom extension. The connection of the plug to receptacle is configured overpower the strength of the spring mechanism 1136 and maintain the connection between plug can receptacle.

When the connection is separated, automatically or manually, spring mechanism 1136 would retract, moving delivery apparatus 1100 into a retracted position as illustrated in FIG. 11B. In this example, the spring mechanism 1136 moves a rigid boom extension into a position closer to the boom 1102, thus bringing electrical line 1104 and its plug up and away from both the ground and pedestrians, increasing safety. When the delivery apparatus 1100 is in the retracted position as illustrated in FIG. 11B, an operator would be able to grab a leverage rope 1138 to pull the electrical line 1104 (and the rigid boom extension, if present) back into reach for connection to the vehicle receptacle.

The various embodiments disclosed herein therefore can include various improved cable management systems, such as but not limited to a sturdy cable hanger that the cable can be manually coiled on after the vehicle drives away, a manual reel that allows an operator to tug the cable to activate the spring-loaded reel, which then neatly coils the cable, and automatic reel that automatically coils the cable once it detects that power has been shut off, allowing for quick cable cleanup without requiring the operator to interact with the system, and an automatic "reach" that automatically retracts the hanging cable to the building or shore power station while keeping the cable off the ground. Any of these options allow the cable to be removed from the ground, ensuring that tripping hazards, drive-off damage, drive-over damage, and other potential cable-related risks are mitigated.

As described above with respect to FIG. 1, specific embodiments include a plug 112 and power receptacle 114 that can be configured to automatically become uncoupled from a trailer/vehicle 110 under specific circumstances, such as when vehicle 110 is started or when the brake system is released. In trucking transportation, the need for electric power, and particularly high voltage power, is necessary to power certain components that are present onto trailers. With the additions of electric pallets jacks, cooler systems, and electric refrigeration "reefer" power applications, high voltage shore power can be a must-have for all fleets. The biggest issue with this demand is the absolute need for high voltage power to be delivered from source to trailer in the safest way possible.

Disclosed embodiments include a means to automatically eject an AC power source plug (e.g., pin and sleeve) by under specific circumstances, such as by detecting activation of an electrical brake circuit or by using a pressure/hydraulic transducer in the air brake line to detect release of brake pressure. In supplying high voltage power to a fleet trailer, safety is the number one need and priority. Disclosed embodiments can assure that power to a trailer will be supplied when safe and that that the power attachment, such as by a delivery apparatus disclosed herein or otherwise, will be safely and automatically disconnected and the power plug will be automatically ejected when the trailer is going to be pulled by a tractor.

In addition to providing a means to automatically de-energize the plug connector as described herein, disclosed embodiments mitigate the risk of damaging the receptacle, plug connector, or AC power cable exterior to the trailer (or other vehicle) by automatically ejecting the connector when the vehicle is ready to move again.

Before a tractor/trailer moves after being parked, the trailer brake must be disengaged. Disclosed embodiments can detect this process occurring, such as by sensing the trailer brake electrical circuit or through the trailer air brake pressure line. When this is detected, the receptacle automatically ejects the connector and prevents damage being incurred to the vehicle or shore power system.

Figure 12:
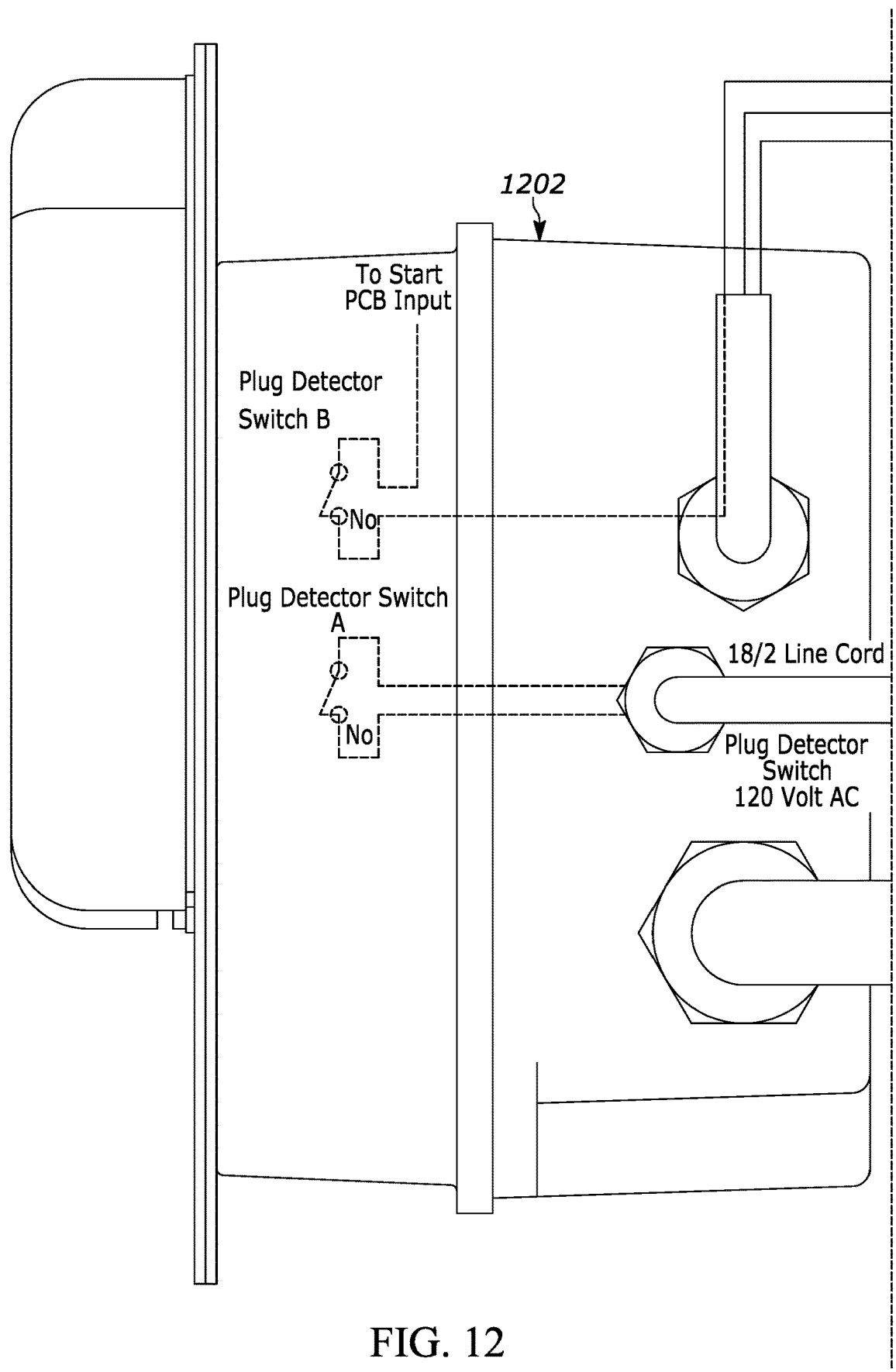
FIG. 12 illustrates an example of an auto-eject receptacle apparatus in accordance with disclosed embodiments.
Figure 12:
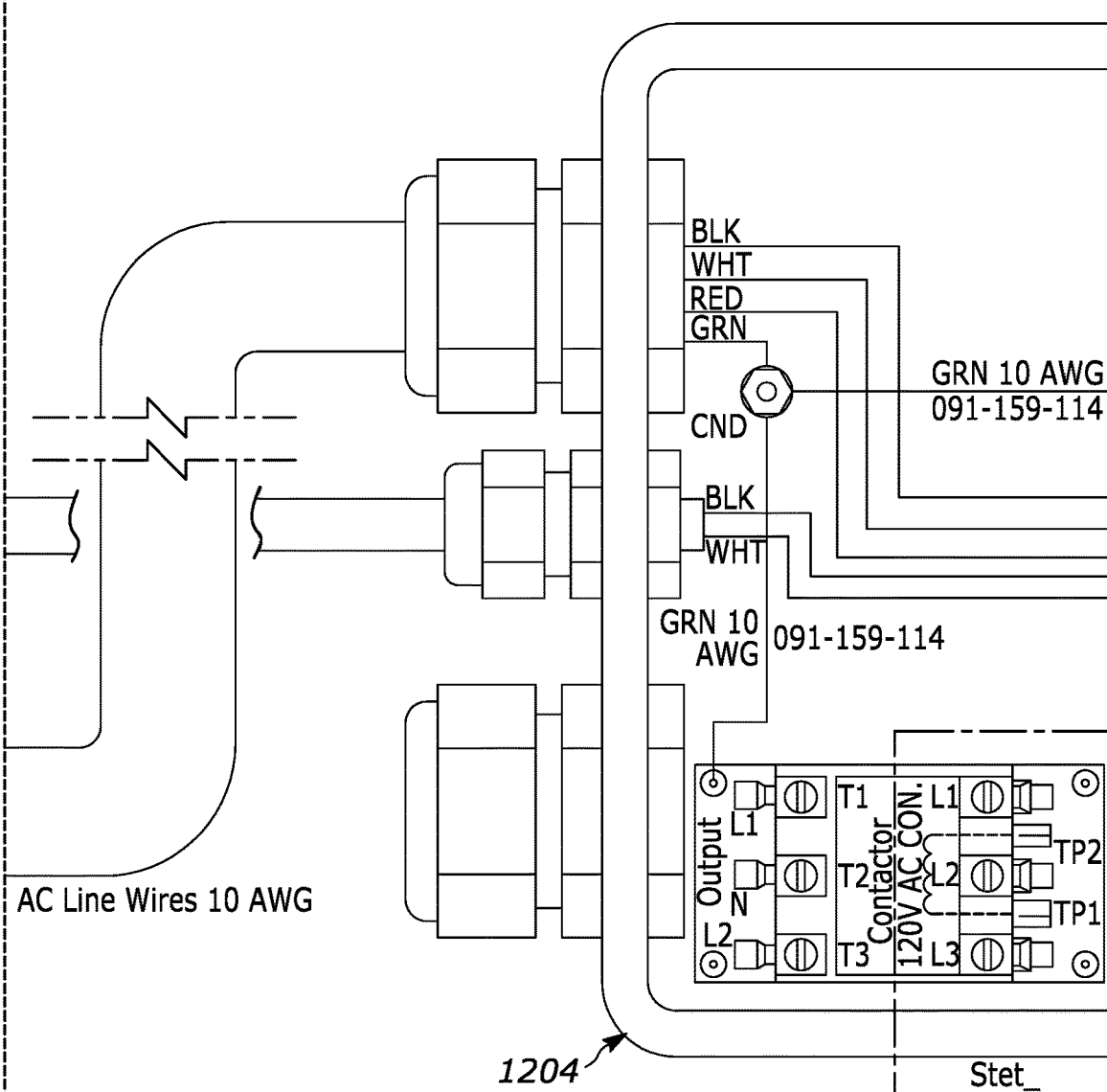
Figure 12:
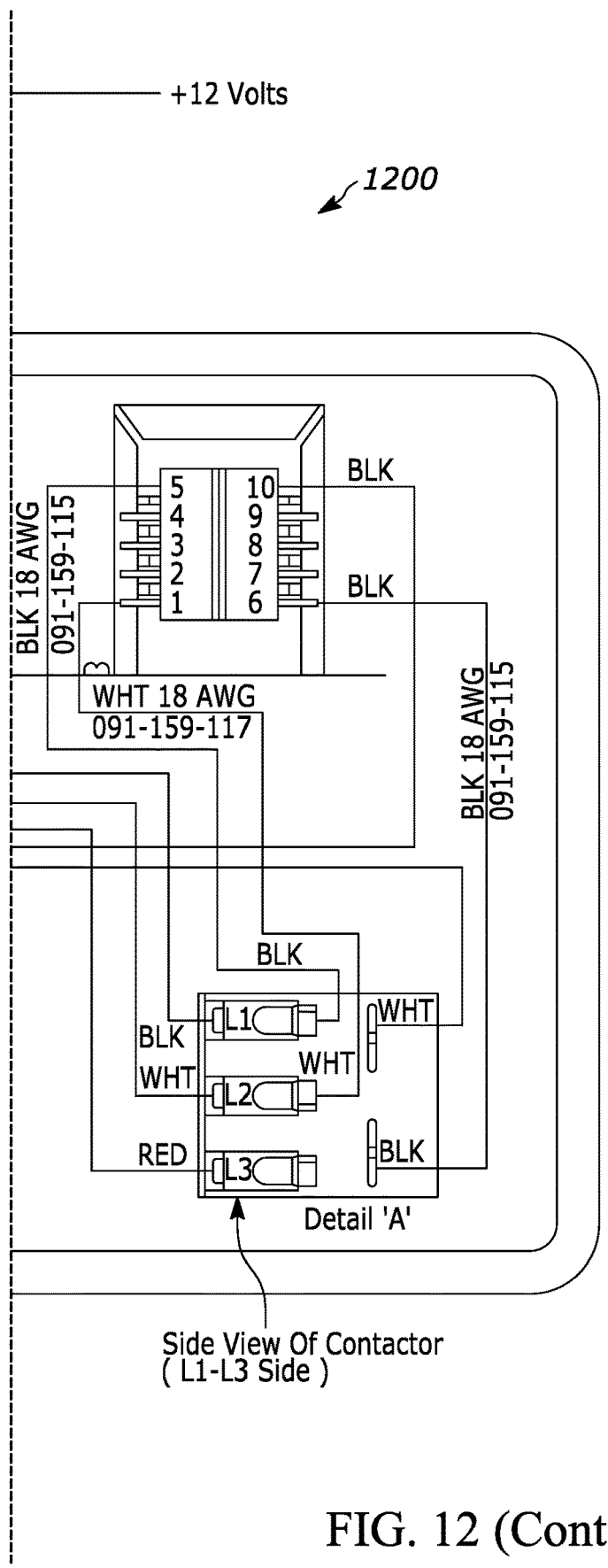

FIG. 12 illustrates a non-limiting example of an auto-eject receptacle apparatus 1200. In this example, the receptacle apparatus 1200 includes a pin and sleeve 480V/3-phase receptacle 1202, electrical controls box assembly 1204 with any necessary transformers, fuses, and contactors, as well the trailer brake detection sensor 1206. Trailer brake detection sensor 1206 can be implemented as a pressure sensor installed in the air brake system and configured to activate when the air-brake pressure drops, indicating that the brakes have been released, as a sensor configured to determine when a brake pedal has been pressed, or otherwise. In some embodiments, other sensors can be used in place of trailer brake detection sensor 1206, such as an ignition sensor configured to determine that the ignition has been switched on, a gear sensor configured to determine that the vehicle has been placed in gear, or otherwise. In specific embodiments, such a trailer brake detection sensor 1206 or other sensor can be implemented as a connection to a "7-way" connector common on many vehicles, which includes outputs for tail/running lights, auxiliary 12V+ charging, right turn/stop lights, left turn/stop lights, and trailer brakes. For example, the trailer brakes output of the 7-way connector can act as the trailer brake detection sensor 1206.

The primary electrical contacts of receptacle 1202 for power deliver can conform to an International Electrotechnical Commission (IEC) standard 4-pin pin-and-sleeve connector for purposes of interoperability, while the additional elements described above provide specific technical distinctions over the IEC standard connector.

FIG. 12 illustrates other elements that can be implemented in various embodiments, including one or more plug-detector switches to detect whether a power plug is properly inserted in the receptacle apparatus and power delivery and routing switches, connections, and controllers. Receptacle apparatus 1200 can also include one or more solenoids or other actuators configured to, when activated, eject a plug from the receptacle 1202. Note that the specific voltages, connections, values, and configuration illustrated in FIG. 12 are non-limiting.

Figure 13A:
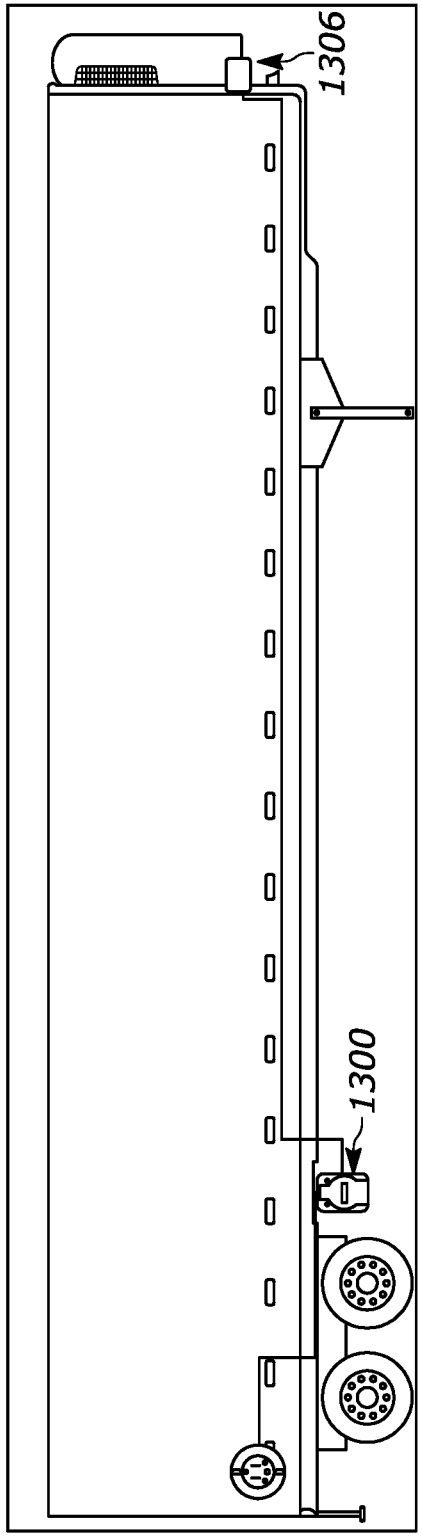
FIGS. 13A-13C illustrate examples of trailer wire diagrams to route AC electrical power through a trailer, in accordance with various disclosed embodiments.
Figure 13B:
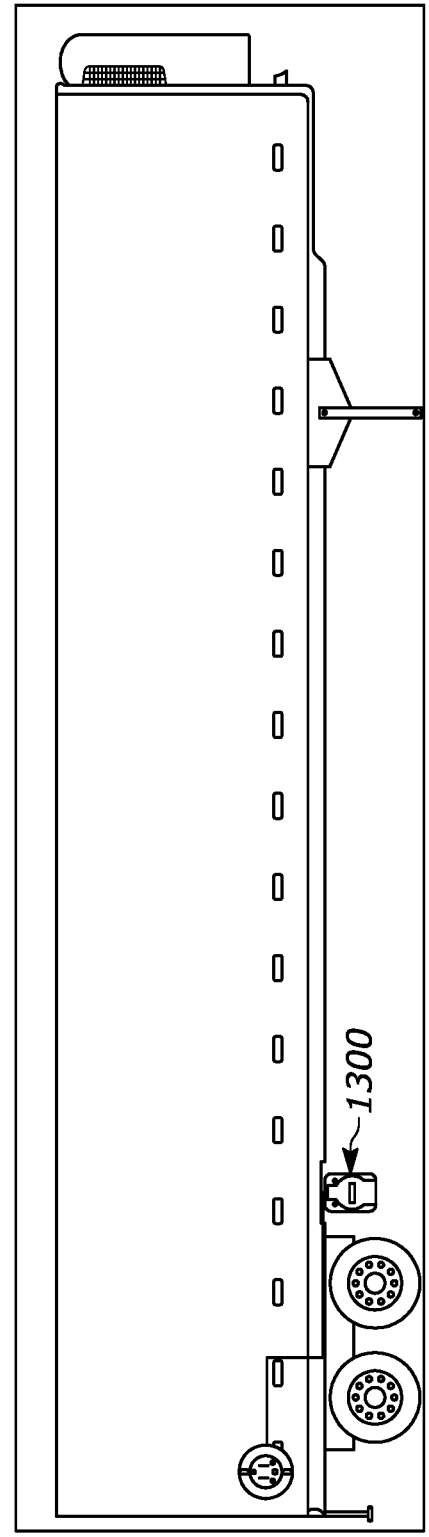
Figure 13C:
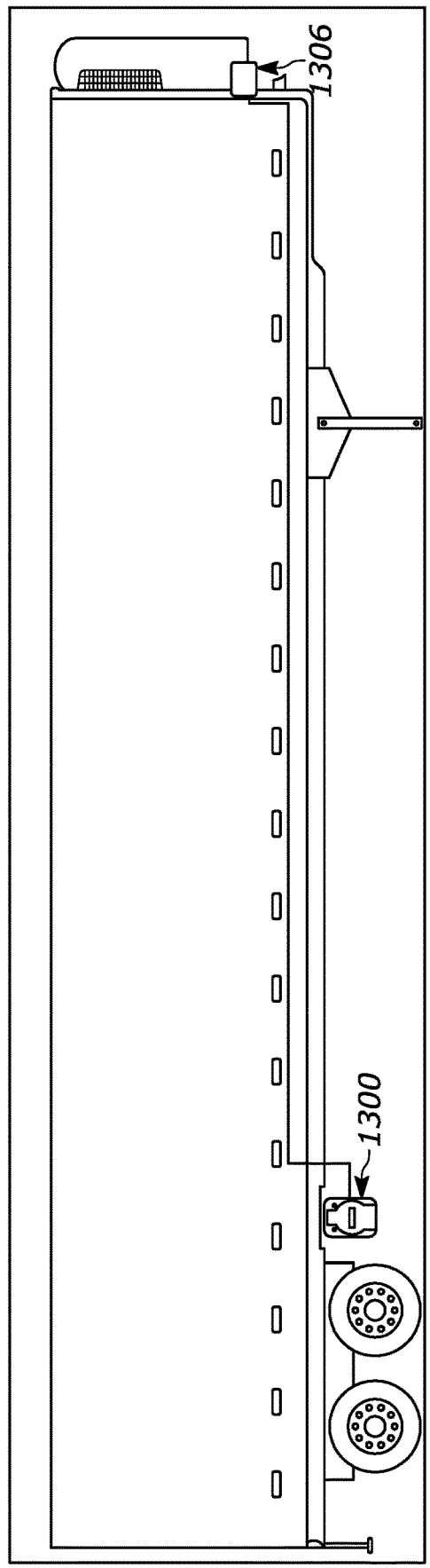

FIGS. 13A-13C illustrate examples of trailer wire diagrams to route AC electrical power through a trailer, in accordance with various disclosed embodiments. Note that, while some figures may illustrate specific exemplary voltages, an auto-eject system as disclosed herein can operate and route 480V, three-phase power, or may be scaled down for other voltage levels (120V/single-phase, 240V/split-phase, etc.). Note, in these examples, receptacle apparatus 1300 and trailer brake detection sensor 1306. These figures show examples of possible placement of receptacle apparatus 1300 and trailer brake detection sensor 1306, but these examples are not limiting and each of these components may be placed elsewhere. These examples also show a refrigeration unit (reefer) at the front of the trailer.

FIG. 13A is a non-limiting example of a trailer with a receptacle apparatus 1300 and a trailer brake detection sensor 1306 as described herein. In this example, the power supplied to receptacle apparatus 1300 is provided both to an on-trailer 120V power supply connection or load and to the reefer.

FIG. 13B is a non-limiting example of a trailer with a receptacle apparatus 1300 as described herein that is particularly useful for a 120V single-phase power source. In this example, the power supplied to receptacle apparatus 1300 is provided to an on-trailer 120V power supply connection or load but not directly to the reefer.

FIG. 13C is a non-limiting example of a trailer with a receptacle apparatus 1300 as described herein that is particularly useful for a 480V 3-phase power source. In this example, the power supplied to receptacle apparatus 1300 is provided directly to the reefer, but of course a step-down or other transformer or circuitry could be used to provide a 120V supply.

Figure 14:
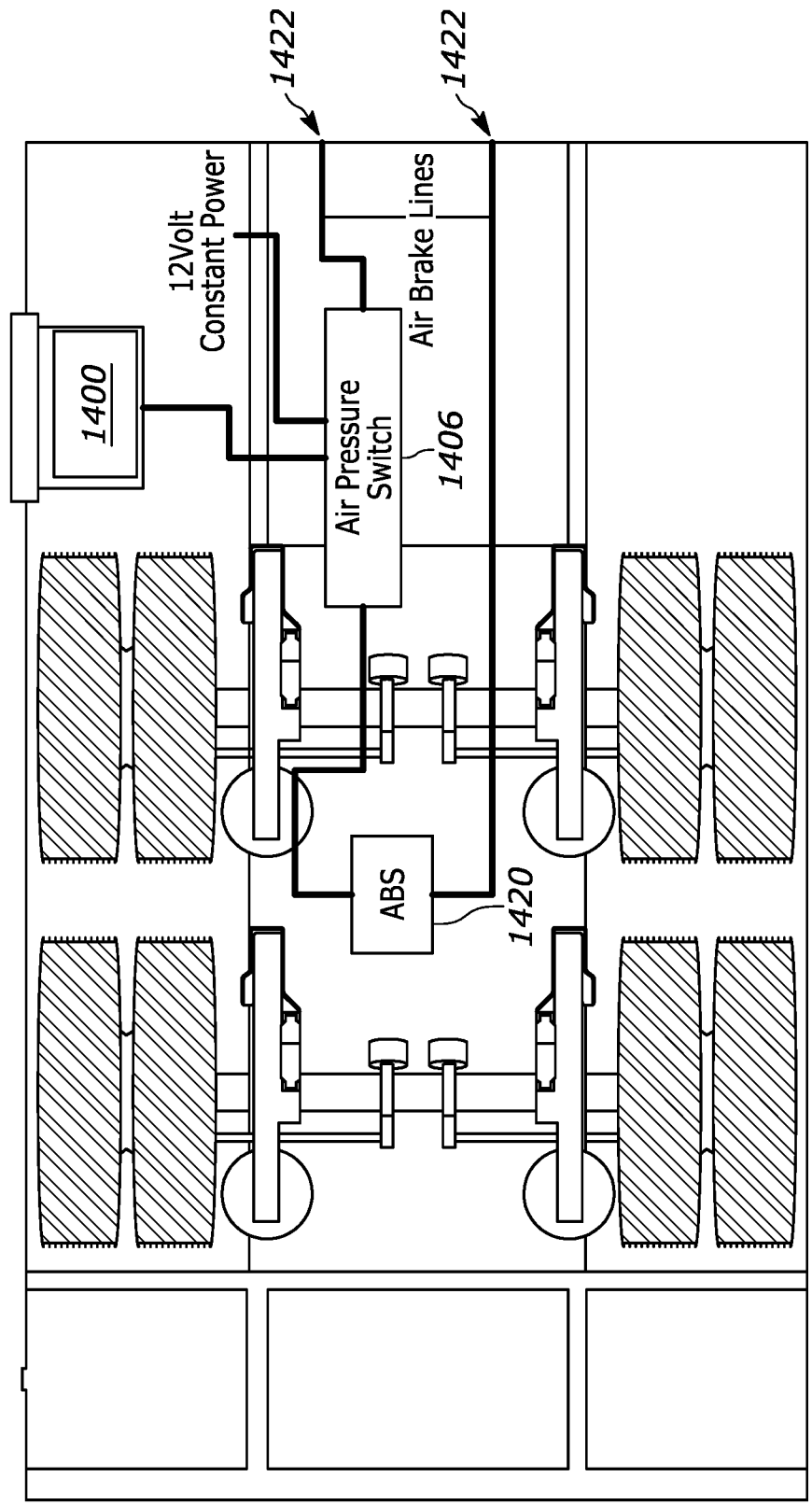
FIG. 14 illustrates an example of a brake air line connection diagram by which brake actuation can be detected in accordance with disclosed embodiments.

FIG. 14 illustrates a non-limiting example of a brake air line connection diagram by which the brake actuation can be detected in accordance with disclosed embodiments. This figure shows a receptacle apparatus 1400 including trailer brake detection sensor 1406, in the form of an air pressure switch configured to monitor pressure in brake lines 1422 of air brake system 1420.

In other embodiments, trailer brake detection sensor 1406, instead of being implemented as an air pressure switch, could be implemented using a brake electric line current sensor or other sensor, connector, or signal as disclosed herein As described above with respect to FIG. 3, a control means can control a drive mechanism to move a delivery apparatus between a deployed position and a retracted position. The control means is connected to the AC power mains and can selectively power the drive mechanism and/or the electrical line to the vehicle.

FIGS. 15-18 illustrate non-limiting examples of aspects of a control means in accordance with disclosed embodiments, for example for supplying transit vehicles or trailers with 480V 3-phase AC electrical power via shore power (e.g., the power mains). One use case of such disclosed control means would be a truck or trailer being parked at a loading dock, such as described in the various exemplary implementations herein. With increasing electrical needs on vehicles, charging in this case is becoming a must. Much is demanded from a shore power source to ensure that operators of these vehicles are safe when working around vehicles being charged. Disclosed embodiments are designed with this safety a number one priority by having the capability to connect and disconnect the high voltage shore power in the appropriate conditions.

A control means as disclosed herein can act as an intermediate between a constant utility standard AC power source (120V Single Phase, 480V 3-phase, etc.) and a power plug that is used to connect to a vehicle power receptacle such as described herein. While the examples discussed herein are focused on trailer applications, systems and devices as described herein can be used on any vehicle that contains the corresponding receptacle. A control means as disclosed herein can include a logic controlled printed circuit board assembly (PCBA) that controls a contactor switch which can connect or disrupt power to the output (electrical line and plug) of the system.

The control means can determine when power should be supplied to the system's output (plug) by detecting if the system's plug is connected to the mating receptacle (which is located on a vehicle or trailer). In various embodiments, the system can supply power manually, by user actuation via a momentary switch, or automatically by connection detection to a mating connector.

The control means can detect when the electrical line and plug to which it is supplying power is no longer connected to a receptacle, such as by detecting a break or drop in current flow, and in response, disconnect power from the electrical line and plug. Similarly, the control means can detect that the plug has been properly connected to a receptacle, such as by measuring current flow, and either automatically power the electrical line and plug or wait for a user actuation before supplying power. In this way, in various embodiments, the control means ensures that the power line is energized only when the plug is properly connected to a receptacle and a power button or other selector is activated.

By automatically detecting when the plug is ejected or removed from its receptacle, and in response, automatically disconnecting the power to the electrical line and plug, the control means increases safety by ensuring that the output cable is no longer energized when it is not actively supplying power to the receptacle.

Figure 15:
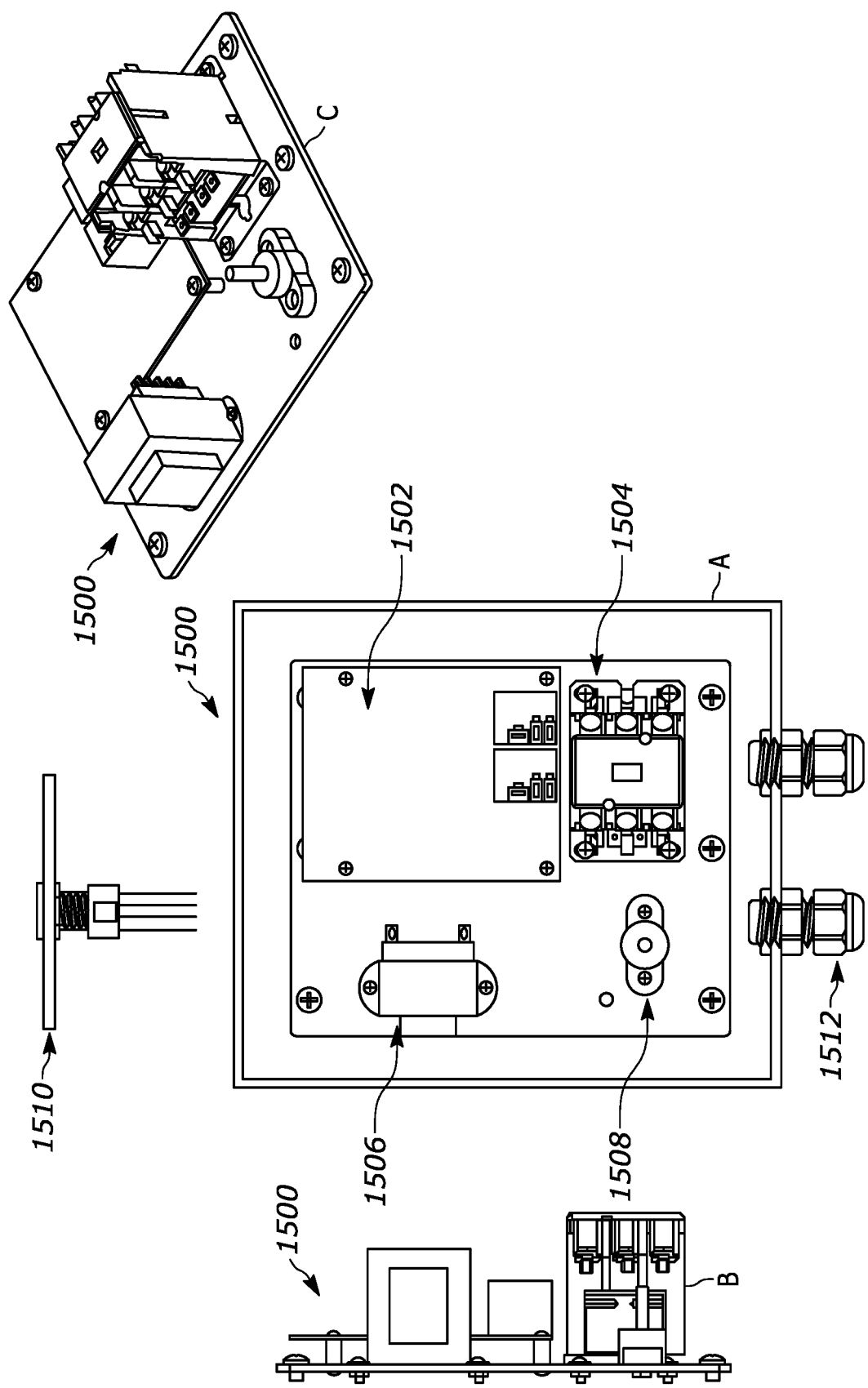
FIGS. 15-18 illustrate examples of aspects of a control means in accordance with disclosed embodiments.

FIG. 15 illustrates a non-limiting example of a plate assembly of a control means 1500 as disclosed herein, where all major system components are enclosed in an appropriately Ingress Protection (IP) rated panel box. FIG. 15 shows, specifically, the PCB logic controller 1502, 30-amp contactor 1504, step-down transformer 1506, safety ground 1508, manual connect button 1510, and water-tight cable pass-through grommets 1512. A panel box can be, for example, a rugged enclosure that meets National Electrical Manufacturers Association (NEMA) and IP67 standards. FIG. 15 illustrates these examples of control means 1500 in a first perspective A, a second perspective B, and a third perspective C.

Figure 16:
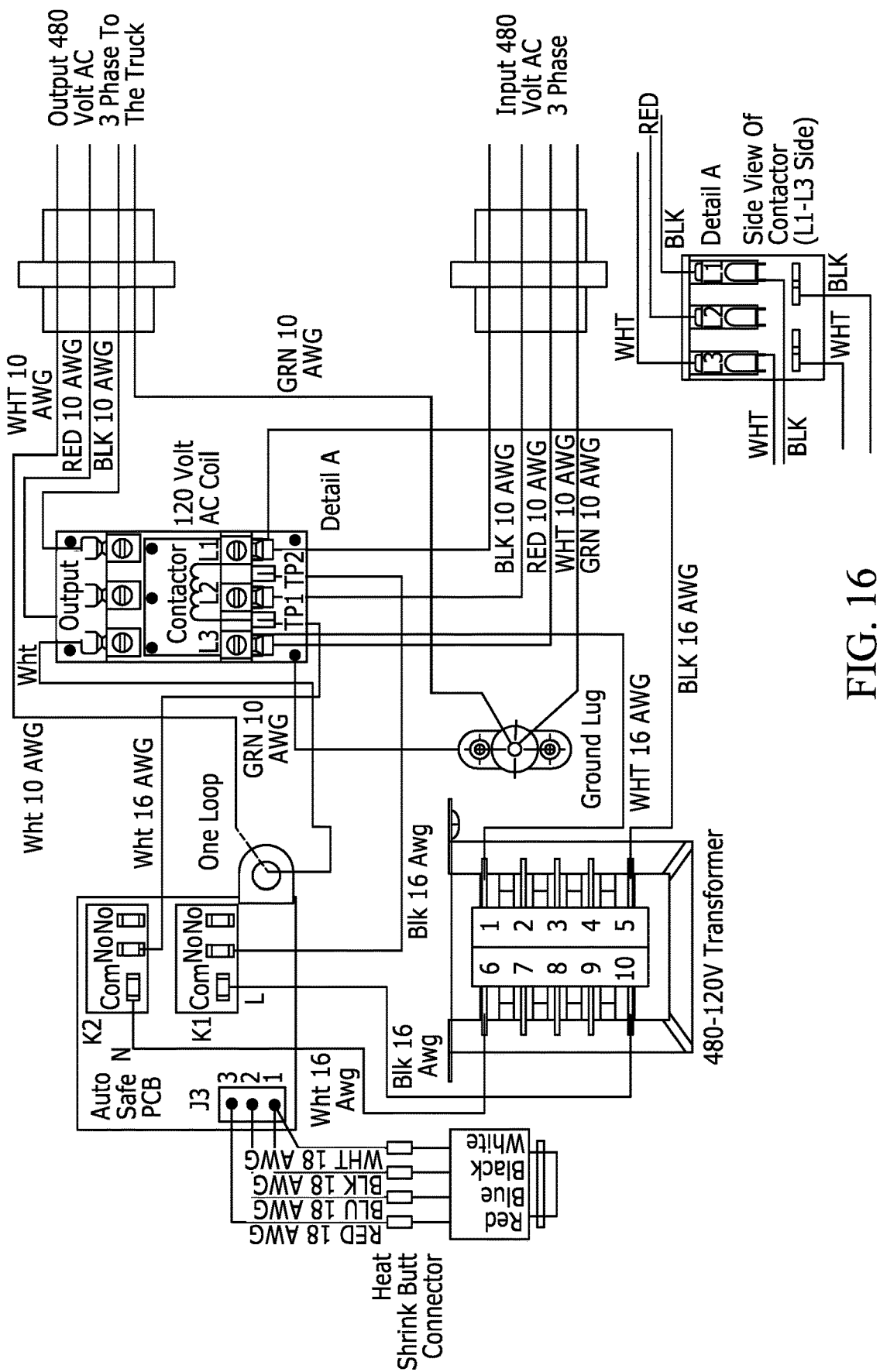

FIG. 16 illustrates a non-limiting example of an electrical wiring diagram for a 480 VAC/3-phase system as disclosed herein, though such an example, could be extended to a 120 VAC/1-phase or other electric utility standard power source. The 480 VAC/3-phase input to the system through the contactor is shown along with the output to the trailer or vehicle. The 480V-120V transformer steps the utility voltage down to power the PCB logic controller 1502.

Figure 17:
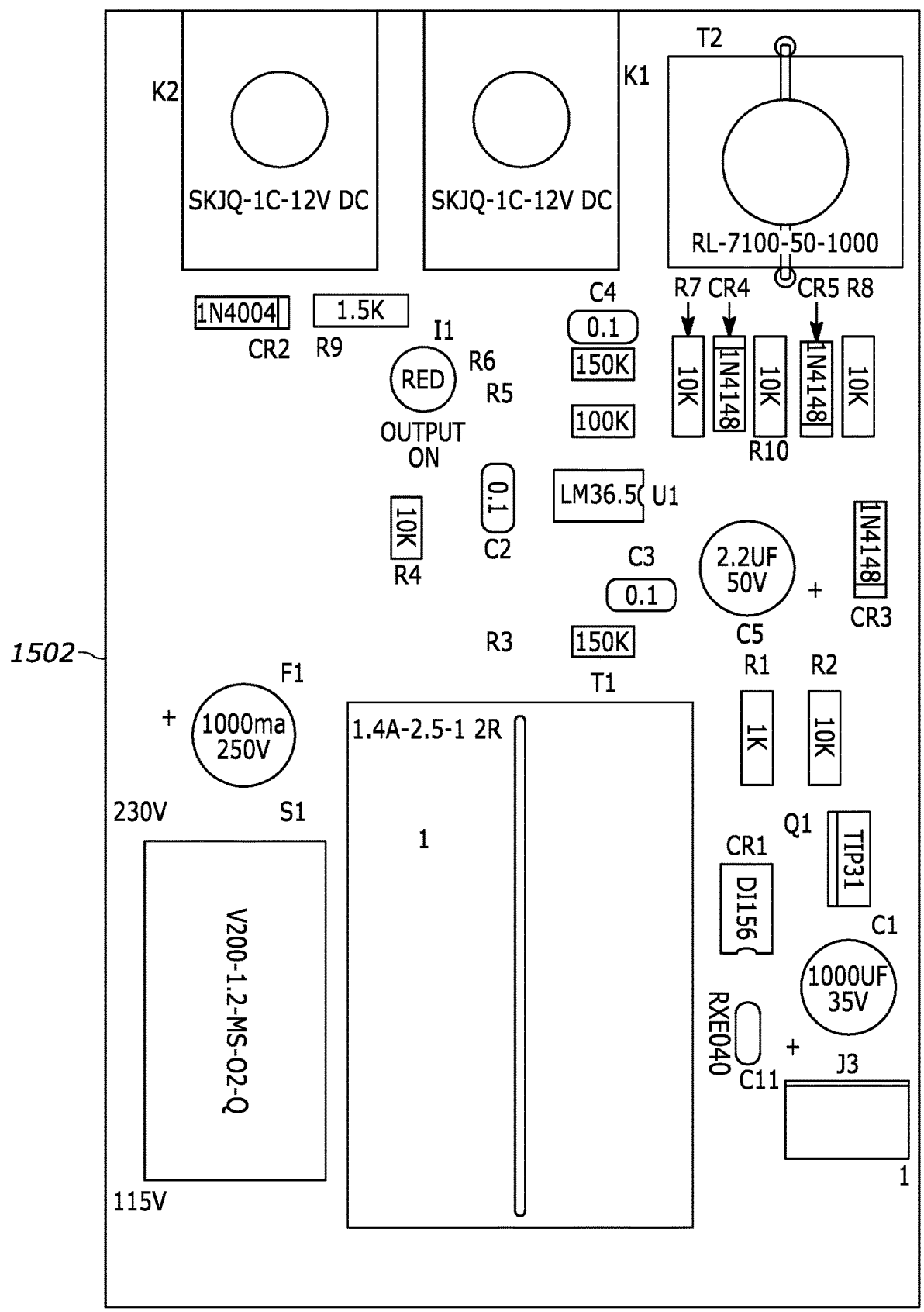

FIG. 17 illustrates a non-limiting example of a top-view of a PCB logic controller 1502 with relevant components shown for this example in accordance with disclosed embodiments. Of course, the specific components and parameters can be changed from this example as necessary for specific implementations. For example, in a 480V implementation R8 can be changed to a 10K, 1 A resistor, diodes CR3 and CR5 can be changed to 100V, 1 A diodes, and resistor R10 can be changed to a 30.1K resistance. Such adjustments are considered to be within the abilities of one of ordinary skill in the art.

Figure 18:
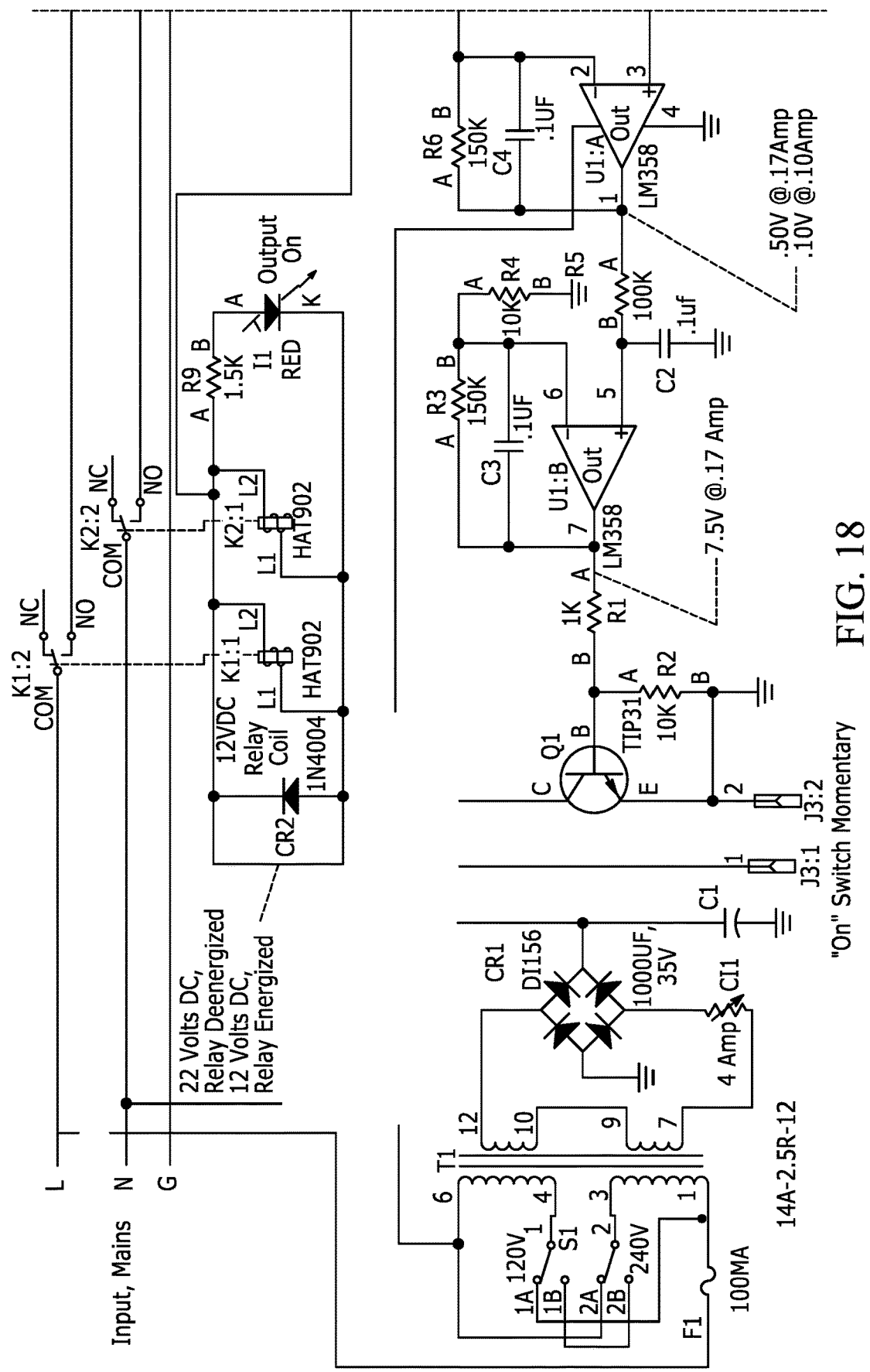
Figure 18:
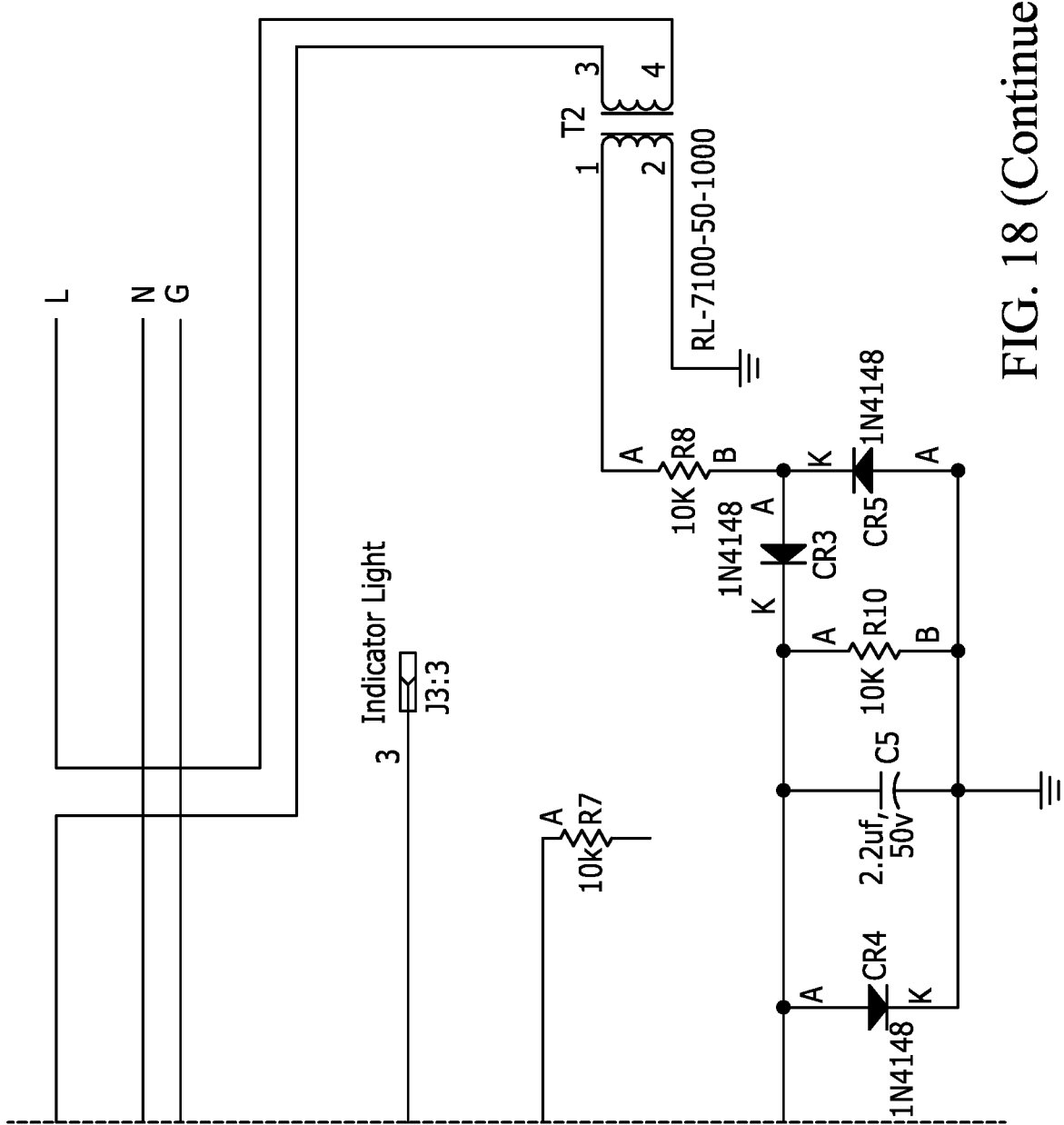

FIG. 18 shows a non-limiting example of an electrical schematic for a PCB logic controller 1502, which includes a plug connection detection circuit (through current sensing transformer "T2" and subsequent op-amp trigger circuitry). In the case of the connector that is plugged into the trailer or vehicle is ejected (automatically or manually), the interruption in current will be detected and the contactor (K1:2 and K2:2) will disconnect the power source and de-energize the connector for safety purposes.

In any of the examples described herein, any of the sensors described herein can be connected to control the receptacle apparatus to eject a plug as described herein. Moreover, multiple ones of these various sensors and inputs can be concurrently connected so that if any of them are activated, the plug is ejected from the receptacle apparatus. This ensures that if any of several events or conditions occurs as described herein, including a detection that a charging process is complete, the plug is ejected to ensure a safe disconnection before the vehicle or trailer moves. Systems and methods as disclosed herein not only are safer than existing systems but can be more convenient for an operator who can simply get into his vehicle and drive away without worrying about disconnection, since the disconnection will occur automatically. This is particularly useful in industries and environments where vehicles or trailers must maintain access to power, such as for refrigeration, but it may not be desirable or permitted to keep an engine idling to supply the power.

Of course, those of skill in the art will recognize that, unless specifically indicated or required by the sequence of operations, certain steps in the processes described above may be omitted, performed concurrently or sequentially, or performed in a different order. Similarly, any of the features described above for different embodiments can be combined with others for still further embodiments within the scope of the disclosure.

Those skilled in the art will recognize that, for simplicity and clarity, the full structure and operation of all systems or mechanisms suitable for use with the present disclosure is not being depicted or described herein. Instead, only so much of a delivery apparatus as is unique to the present disclosure or necessary for an understanding of the present disclosure is depicted and described. The remainder of the construction and operation of the embodiments above may conform to any of the various current implementations and practices known in the art.

Although an exemplary embodiment of the present disclosure has been described in detail, those skilled in the art will understand that various changes, substitutions, variations, and improvements disclosed herein may be made without departing from the spirit and scope of the disclosure in its broadest form. Specific structures, dimensions, shapes, voltages, connections, commercial products, and other features described or illustrated herein are non-limiting unless specifically claimed.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle. The use of terms such as (but not limited to) "mechanism," "module," "device," "unit," "component," "element," "member," "apparatus," "machine," "system," "processor," or "controller," within a claim is understood and intended to refer to structures known to those skilled in the relevant art, as further modified or enhanced by the features of the claims themselves, and is not intended to invoke 35 U.S.C. § 112(f).

What is claimed is:

1. An electrical delivery apparatus, comprising:
a plug assembly configured to be inserted into a receptacle apparatus of a vehicle to deliver electrical power to the vehicle;
a control means configured to:
upon activation, deliver electrical power to the vehicle via an electrical line and the plug assembly, and
upon detection of at least one predetermined condition, automatically disconnect the electrical power from the electrical line and the plug assembly,
wherein the at least one predetermined condition includes disconnection of the plug assembly from the receptacle apparatus, and
wherein the receptacle apparatus is configured to eject the plug assembly from the receptacle apparatus upon detection of a brake pressure release, a brake electrical signal, or vehicle ignition signal.

2. The electrical delivery apparatus of claim 1, wherein the receptacle apparatus includes a solenoid configured to physically eject the plug assembly from the receptacle apparatus.

3. The electrical delivery apparatus of claim 1, the receptacle apparatus is configured to detect that a charging process is complete and, in response, eject the plug assembly from the receptacle apparatus.

4. The electrical delivery apparatus of claim 1, wherein the receptacle apparatus is connected to a brake pressure sensor and is further configured to, in response to a signal from the brake pressure sensor, eject the plug assembly from the receptacle apparatus.

5. An electrical delivery apparatus, comprising:
a plug assembly configured to be inserted into a receptacle apparatus of a vehicle to deliver electrical power to the vehicle;
a control means configured to:
upon activation, deliver electrical power to the vehicle via an electrical line and the plug assembly, wherein the control means is activated by detecting a button-press by an operator, and
upon detection of at least one predetermined condition, automatically disconnect the electrical power from the electrical line and the plug assembly,
wherein the at least one predetermined condition includes disconnection of the plug assembly from the receptacle apparatus.

6. The electrical delivery apparatus of claim 5, wherein the receptacle apparatus is configured to detect the brake pressure release, the brake electrical signal, or the vehicle ignition signal.

7. The electrical delivery apparatus of claim 5, wherein the control means is activated by detecting the button-press by the operator while also detecting that the plug assembly is inserted in the receptacle apparatus.

8. The electrical delivery apparatus of claim 5, wherein the delivery apparatus configured to retract the electrical line from the vehicle when the plug assembly is disconnected from the receptacle apparatus.

9. The electrical delivery apparatus of claim 8, wherein the delivery apparatus further comprises a boom that extends from a support structure and supports the electrical line between the control means and the plug assembly, and wherein the electrical line is retracted along the boom when the plug assembly is disconnected from the receptacle apparatus.

10. The electrical delivery apparatus of claim 9, wherein the boom is configured to support the electrical line so that the electrical line and the plug assembly do not touch the ground when the plug assembly is connected to the receptable apparatus and when the plug assembly is disconnected from the receptacle apparatus.

11. The electrical delivery apparatus of claim 9, further comprising a drive mechanism mounted to the support structure and configured to move the electrical line between a deployed position and a retracted position.

12. The electrical delivery apparatus of claim 9, wherein the drive mechanism is one of a chain-driven track system, a spring-driven automatic reel, a spring-driven slide rail mechanism, a gravity-driven slide rail mechanism, or a linear actuator-driven mechanism.

13. An electrical delivery apparatus, comprising:
a plug assembly configured to be inserted into a receptacle apparatus of a vehicle to deliver electrical power to the vehicle;
a control means configured to:
upon activation, deliver electrical power to the vehicle via an electrical line and the plug assembly, wherein the control means is activated by detecting a button-press by an operator, and
upon detection of at least one predetermined condition, automatically disconnect the electrical power from the electrical line and the plug assembly, wherein the at least one predetermined condition includes disconnection of the plug assembly from the receptacle apparatus;

a support structure; and a drive mechanism mounted to the support structure and configured to retract the electrical line from the vehicle when the plug assembly is disconnected from the receptacle apparatus.

14. The electrical delivery apparatus of claim 13, further comprising a boom that extends from a support structure and supports the electrical line between the control means and the plug assembly, and wherein the electrical line is retracted along the boom when the plug assembly is disconnected from the receptacle apparatus.

15. The electrical delivery apparatus of claim 13, wherein the drive mechanism is one of a chain-driven track system, a spring-driven automatic reel, a spring-driven slide rail mechanism, a gravity-driven slide rail mechanism, or a linear actuator-driven mechanism.

16. The electrical delivery apparatus of claim 13, wherein the drive mechanism is controlled by the control means to retract the electrical line.

17. The electrical delivery apparatus of claim 13, wherein the drive mechanism is configured to move the electrical line between a deployed position and a retracted position.

18. An electrical delivery apparatus, comprising:

a plug assembly configured to be inserted into a receptacle apparatus of a vehicle to deliver electrical power to the vehicle;

a control means configured to:

upon activation, deliver electrical power to the vehicle via an electrical line and the plug assembly, wherein the control means is activated by detecting a button-press by an operator, and upon detection of at least one predetermined condition, automatically disconnect the electrical power from the electrical line and the plug assembly, wherein the at least one predetermined condition includes disconnection of the plug assembly from the receptacle apparatus;

a support structure; and a drive mechanism mounted to the support structure and configured to retract the electrical line from the vehicle when the plug assembly is disconnected from the receptacle apparatus, wherein the receptacle apparatus is configured to detect a brake pressure release, a brake electrical signal, and a vehicle ignition signal, and is configured eject the plug assembly from the receptacle apparatus upon detection of the brake pressure release, the brake electrical signal, or the vehicle ignition signal.

19. The electrical delivery apparatus of claim 18, wherein the receptacle apparatus is connected to a brake pressure sensor of the vehicle and is further configured to, in response to a signal from the brake pressure sensor, eject the plug assembly from the receptacle apparatus.

* * * * *